US008566178B1

(12) United States Patent
Robinson et al.

(10) Patent No.: US 8,566,178 B1
(45) Date of Patent: Oct. 22, 2013

(54) METHODS AND SYSTEMS FOR SEARCHING FOR AND IDENTIFYING DATA REPOSITORY DEFICITS

(75) Inventors: James G. Robinson, Olympia, CA (US); Terrence R. Nightingale, Marysville, WA (US); Scott Allen Mongrain, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/614,844

(22) Filed: Sep. 13, 2012

Related U.S. Application Data

(63) Continuation of application No. 13/196,799, filed on Aug. 2, 2011, now Pat. No. 8,290,811, which is a continuation of application No. 11/864,521, filed on Sep. 28, 2007, now Pat. No. 8,001,003.

(51) Int. Cl.
*G06Q 30/00* (2012.01)
*G06Q 10/00* (2012.01)

(52) U.S. Cl.
USPC ..... 705/26.7; 705/14.53; 705/7.29; 705/7.32; 705/347

(58) Field of Classification Search
USPC ................ 705/14.53, 14.12, 7.29, 7.32, 26.7
See application file for complete search history.

(56) References Cited

U.S. PATENT DOCUMENTS

| 4,870,579 A | 9/1989 | Hey |
|---|---|---|
| 4,992,940 A | 2/1991 | Dworkin |
| 5,128,861 A | 7/1992 | Kagami et al. |
| 5,583,763 A | 12/1996 | Atcheson et al. |
| 5,774,870 A | 6/1998 | Storey |
| 5,794,210 A | 8/1998 | Goldhaber et al. |
| 5,796,395 A | 8/1998 | de Hond |
| 5,823,879 A | 10/1998 | Goldberg et al. |

(Continued)

FOREIGN PATENT DOCUMENTS

| EP | 0751471 A1 | 2/1997 |
|---|---|---|
| JP | 409265478 A | 10/1997 |

(Continued)

OTHER PUBLICATIONS

Herlocker, Jonathan L.; "Evaluating Collaborative Filtering Recommender Systems";Jan. 2004; ACM Transactions Information Systems; pp. 5-53; filename HerlockerEvalCollabFiltRecomSysJan2004.*

(Continued)

*Primary Examiner* — John G Weiss
*Assistant Examiner* — Adam Chornesky
(74) *Attorney, Agent, or Firm* — Knobbe, Martens, Olson & Bear LLP

(57) ABSTRACT

A computing system for searching for and identifying data repository deficits includes an interactive database of items, a data repository that stores a first type of information related to items, a search engine configured to identify items that do not have an amount of the first type of information that meets a first threshold, a candidate selection interface that provides functionality for the user to select an item from recommended candidate items needing the first type of information, a user interface via which the user can provide the first type of information for an item selected by the user, a game system configured to calculate for a game scores and rankings based at least in part on data stored in the data repository.

20 Claims, 38 Drawing Sheets

(56) References Cited

U.S. PATENT DOCUMENTS

| | | | |
|---|---|---|---|
| 5,884,282 A | 3/1999 | Robinson | |
| 5,913,032 A | 6/1999 | Schwartz | |
| 5,918,014 A | 6/1999 | Robinson | |
| 5,950,172 A | 9/1999 | Klingman | |
| 5,956,693 A | 9/1999 | Geerlings | |
| 5,963,919 A | 10/1999 | Brinkley et al. | |
| 5,974,396 A | 10/1999 | Anderson et al. | |
| 5,988,346 A | 11/1999 | Tedesco et al. | |
| 6,029,141 A | 2/2000 | Bezos et al. | |
| 6,041,311 A | 3/2000 | Chislenko et al. | |
| 6,049,777 A | 4/2000 | Sheena et al. | |
| 6,049,778 A | 4/2000 | Walker et al. | |
| 6,055,519 A | 4/2000 | Kennedy et al. | |
| 6,064,980 A | 5/2000 | Jacobi et al. | |
| 6,092,049 A | 7/2000 | Chislenko et al. | |
| 6,102,287 A | 8/2000 | Matyas, Jr. | |
| 6,112,186 A | 8/2000 | Bergh et al. | |
| 6,151,586 A | 11/2000 | Brown | |
| 6,175,831 B1 | 1/2001 | Weinreich et al. | |
| 6,249,773 B1 | 6/2001 | Allard et al. | |
| 6,266,649 B1 | 7/2001 | Linden et al. | |
| 6,269,369 B1 | 7/2001 | Robertson | |
| 6,317,722 B1 | 11/2001 | Jacobi et al. | |
| 6,321,211 B1 | 11/2001 | Dodd | |
| 6,321,221 B1 | 11/2001 | Bieganski | |
| 6,356,899 B1* | 3/2002 | Chakrabarti et al. | 707/737 |
| 6,366,910 B1 | 4/2002 | Rajaraman et al. | |
| 6,460,036 B1 | 10/2002 | Herz | |
| 6,473,738 B1 | 10/2002 | Garrett | |
| 6,484,149 B1 | 11/2002 | Jammes et al. | |
| 6,513,033 B1 | 1/2003 | Trauring | |
| 6,525,747 B1 | 2/2003 | Bezos | |
| 6,611,814 B1 | 8/2003 | Lee et al. | |
| 6,782,370 B1 | 8/2004 | Stack | |
| 6,865,546 B1 | 3/2005 | Song | |
| 6,912,505 B2 | 6/2005 | Linden et al. | |
| 6,963,848 B1 | 11/2005 | Brinkerhoff | |
| 6,999,962 B2* | 2/2006 | Julliard et al. | 1/1 |
| 7,150,030 B1 | 12/2006 | Eldering et al. | |
| 7,181,438 B1* | 2/2007 | Szabo | 1/1 |
| 7,184,971 B1* | 2/2007 | Ferber | 705/14.16 |
| 7,299,067 B2 | 11/2007 | Riggs | |
| 7,310,612 B2 | 12/2007 | McQueen, III et al. | |
| 7,363,214 B2 | 4/2008 | Musgrove et al. | |
| 7,389,294 B2 | 6/2008 | Kotas et al. | |
| 7,428,496 B1 | 9/2008 | Keller et al. | |
| 7,433,832 B1 | 10/2008 | Bezos et al. | |
| 7,447,667 B2* | 11/2008 | Gong et al. | 706/47 |
| 7,478,054 B1 | 1/2009 | Adams et al. | |
| 7,523,085 B2 | 4/2009 | Nigam et al. | |
| 7,552,068 B1 | 6/2009 | Brinkerhoff | |
| 7,617,122 B2* | 11/2009 | Kumar et al. | 705/14.53 |
| 7,624,336 B2* | 11/2009 | Crawford et al. | 714/820 |
| 7,657,555 B2 | 2/2010 | Rorex et al. | |
| 7,664,669 B1 | 2/2010 | Adams et al. | |
| 7,672,868 B1 | 3/2010 | Keller et al. | |
| 7,685,117 B2 | 3/2010 | Gross | |
| 7,689,457 B2* | 3/2010 | Chan et al. | 705/26.7 |
| 7,711,743 B2 | 5/2010 | Cavagnaro et al. | |
| 7,731,590 B2 | 6/2010 | Azuma | |
| 7,769,613 B2 | 8/2010 | Han et al. | |
| 7,778,890 B1 | 8/2010 | Bezos et al. | |
| 7,860,803 B1* | 12/2010 | Chang et al. | 705/65 |
| 7,881,975 B2 | 2/2011 | Calabria | |
| 7,917,391 B2* | 3/2011 | Smith et al. | 705/14.63 |
| 8,001,003 B1* | 8/2011 | Robinson et al. | 705/14.53 |
| 8,108,255 B1* | 1/2012 | Robinson et al. | 705/14.44 |
| 8,140,380 B2* | 3/2012 | Keller et al. | 705/7.32 |
| 8,219,635 B2* | 7/2012 | Ganesan et al. | 709/217 |
| 8,224,715 B2* | 7/2012 | Kumar et al. | 705/26.7 |
| 8,290,810 B2* | 10/2012 | Ramer et al. | 705/7.32 |
| 8,290,811 B1* | 10/2012 | Robinson et al. | 705/7.32 |
| 8,301,623 B2* | 10/2012 | Chakrabarti et al. | 707/723 |
| 2001/0037206 A1 | 11/2001 | Falk et al. | |
| 2002/0019763 A1* | 2/2002 | Linden et al. | 705/10 |
| 2002/0023132 A1 | 2/2002 | Tornabene | |
| 2002/0026396 A1 | 2/2002 | Dent et al. | |
| 2002/0042775 A1 | 4/2002 | Nelson et al. | |
| 2002/0095298 A1 | 7/2002 | Ewing | |
| 2002/0165905 A1 | 11/2002 | Wilson | |
| 2002/0178072 A1* | 11/2002 | Gusler et al. | 705/26 |
| 2003/0074265 A1 | 4/2003 | Oshima | |
| 2004/0034631 A1* | 2/2004 | Julliard et al. | 707/4 |
| 2004/0078265 A1 | 4/2004 | Subramanian et al. | |
| 2004/0172588 A1 | 9/2004 | Mattaway | |
| 2005/0034071 A1 | 2/2005 | Musgrove et al. | |
| 2005/0131909 A1 | 6/2005 | Cavagnaro et al. | |
| 2005/0132305 A1 | 6/2005 | Guichard et al. | |
| 2005/0187932 A1 | 8/2005 | Kanayama et al. | |
| 2005/0203800 A1* | 9/2005 | Sweeney et al. | 705/14 |
| 2005/0261919 A1 | 11/2005 | Kundtz et al. | |
| 2005/0262317 A1 | 11/2005 | Nakanishi et al. | |
| 2006/0041548 A1 | 2/2006 | Parsons et al. | |
| 2006/0143066 A1 | 6/2006 | Calabria | |
| 2006/0167747 A1* | 7/2006 | Goodman et al. | 705/14 |
| 2006/0200342 A1 | 9/2006 | Corston-Oliver et al. | |
| 2006/0218245 A1 | 9/2006 | Horn | |
| 2007/0038615 A1 | 2/2007 | Vadon et al. | |
| 2007/0078832 A1 | 4/2007 | Ott et al. | |
| 2007/0088801 A1 | 4/2007 | Levkovitz et al. | |
| 2007/0088852 A1 | 4/2007 | Levkovitz | |
| 2007/0090185 A1* | 4/2007 | Lewkowitz et al. | 235/383 |
| 2007/0112760 A1 | 5/2007 | Chea et al. | |
| 2007/0150428 A1* | 6/2007 | Webb | 706/46 |
| 2007/0155490 A1 | 7/2007 | Phillips et al. | |
| 2007/0167240 A1 | 7/2007 | Takeshi | |
| 2007/0168487 A1 | 7/2007 | DuFour | |
| 2007/0179835 A1 | 8/2007 | Ott et al. | |
| 2008/0005064 A1* | 1/2008 | Sarukkai | 707/3 |
| 2008/0071602 A1 | 3/2008 | Ojakaar et al. | |
| 2008/0109232 A1 | 5/2008 | Musgrove et al. | |
| 2008/0195582 A1 | 8/2008 | Yu et al. | |
| 2011/0196895 A1* | 8/2011 | Yi | 707/776 |

FOREIGN PATENT DOCUMENTS

| | | |
|---|---|---|
| KR | 2001029098 | 4/2001 |
| WO | WO 99/23591 | 5/1999 |
| WO | WO 00/62223 | 10/2000 |
| WO | WO 01/15002 A2 | 3/2001 |

OTHER PUBLICATIONS

Wikipedia Jan. 25, 2005; Recommender System; retrieved from Internet Archive Wayback Machine; filename RecommenderSys25jan2012Wikipedia.*

Wikipedia Feb. 8, 2007; Collaborative Filtering; retrieved from Internet Archive Wayback Machine; filename CollaborativeFiltering08Feb2007Wikipedia.*

Overstock.com; "Jagged Edge Journey Vest"; WayBack Machine capture from Jun. 6, 2004; p. 2 "This product has no reviews on file" and "Click here to write a review" under "Selected Customer Reviews"; OverstockRecommendVoid06Jun2004.*

Overstock.com; "Dell Optiplex P200 MMX with 15-inch Monitor"; p. 2 under "Customer Reviews" 3 4- and 5-star reviews and "Click here to write a review"; Jun. 3, 2002; file OverstockRecommend03jun2002.*

"A few well placed Questions", Inc., Sep. 15, 1998 [retrieved on Jun. 26, 2002]. vol. 20, Issue 13, 2 pages, Received from: Proquest Direct.

"BizRate Names 'The Buyers' Best' Online Merchants in Customer Satisfaction for June", PR Newswire, Jul. 2, 1998 [retrieved Feb. 20, 2003], pp. 1-2, retrieved from: Proquest Direct.

"eBay Launches the Most Comprehensive Trust and Safety Upgrades to the World's Largest Person-to-Person Trading Site." PR Newswire, Jan. 15, 1999.

"Epinions.com Announces the Launch of its Free Online Shopping Guide Powered by Consumer Opinions." PR Newswire, p. 2829, Sep. 8, 1999.

"Home, Netscape, Yahoo! Veterans Announce Epinions.com." PR Newswire, p. 8921, Jul. 12, 1999.

(56) References Cited

OTHER PUBLICATIONS

"Instant Survey Gets Info from Customers, Fast", Small Business Information, Dec. 21, 1998 [retrieved on Jun. 26, 2002], 2 pages, retrieved from: http://sbinformation.about.com/library/weekly.
"L.L. Bean, Inc: Corporate Strategy", Harvard Business School, May 18, 1988, pp. 7, 8, and 17.
"MyGiftList.com Announces launch of Online Gift Registry" Dec. 1999, Business Wire.
"NetReflector's www.InstantSurvey.com Goes Live Today", Business Wire, Mar. 23, 1998 [retrieved on Jun. 26, 2002], 3 pages, retrieved from: Proquest Direct.
A. Barrett, "What's Your Epinion?", PC World, Sep. 13, 1999 (2 pages printed from PCWORLD.COM website).
Abstract: "Just Add People—Collaborative filtering brings human input to information retrieval in the enterprise," Information Week, Dec. 22, 1997, informationweek.com.
Amazon: Paquet, Cheri; Amazon.com Buys Junglee and PlanetAll: PC World Online, Aug. 5, 1998, Proquest #58947830.
Amazon: Weil, Nancy; "PlanetAll Keeps Online Masses Organized," PC World Online, Aug. 14, 1998, Proquest #33761930.
B. Tedeschi, "Fulfilling Orders Is a Challenge for Many Internet Companies" The New York Times on the Web, dated Sep. 27, 1999 (5 pages).
Barrett, Alexandra. What's Your Epinion? Network World, page NA, Sep. 13, 1999.
C. Kirby, "Everyone's a Critic—Web sites Hope online reviews of products lead to online buying," San Francisco Chronicle, Jan. 22, 2000 (3 pages printed from sfgate.com website).
Colacecchi, Mary Beth, "Conquering last-minute mania; inventory, service and staff planning are key; mail order business": Mar. 1994.
U.S. Appl. No. 11/863,094, filed Sep. 27, 2007.
D. Willmott, "Deja View," PC Magazine Online. dated May 26, 1999 (2 pages).
D. Willmott, "epinions.com," PC Magazine, dated Sep. 10, 1999 (2 pages printed from zdnet.com website).
Dragan, Richard, et al., "Advice from the Web", PC Magazine, Sep. 9, 1997, [retrieved Jun. 9, 2005], vol. 16, No. 15, pp. 1-9, retrieved from: Dialog, file 275.
eBay's Feedback Forum web site, archived on Oct. 12, 1999 by web.archive.org [URL: http://web.archive.org/web/19991012065814/pages.ebay.com/ . . . ].
Epinions.com. www.epinions.com, Dec. 4, 1999 [retrieved May 17, 2004], pp. 1021, retrieved from: Google.com and archive.org.
Hiam, Alexander, "Marketing for Dummies", IDG Books Worldwide, 1997, pp. 98-108.
Hof, Robert D., "Technology, Technology, Technology", Business Week, Dec. 13, 1998 [retrieved on Jun. 25, 2002], 2 pages, retrieved from: Proquest Direct.
Labounty, Char, "Perception Predominates", Service News, Nov. 1998 [retrieved on Jun. 26, 2002], vol. 18, Issue 12, 2 pages, retrieved from : Proquest Direct.
Lenatti, Chuck. "Auction Mania." Upside, vol. 11 No. 7, pp. 84-92, Jul. 1999.
Leong, Kathy Chin, "Customer Service Gets the Royal Treatment", Internetweek, Sep. 14, 1998 [retrieved Jun. 26, 2002], pp. 1-4, retrieved from: Proquest Direct.
M. Roscheisen, C. Mogensen and T. Winograd, "Beyond browsing: shared comments, SOAPs, trails, and online communities," Computer Networks and ISDN Systems, Proceedings of the Third International World-Wide Web Conference, pp. 739•749, dated Apr. 1995.
Magazzine, Tom, "Re-evaluating business processes", May/Jun. 1998 [retrieved Jul. 11, 2002], vol. 12, Issue 3, 7 pages, retrieved from: Proquest Direct.
Net Perceptions, Inc., "Net Perceptions: The GroupLens Solution", www.netperceptions.com, Jan. 18, 1997 [retrieved Feb. 11, 2005], pp. 1-31, retrieved from: Google.com and archive.org.
PlanetAll: Internet Archive Wayback Machine, www.archive.org; www.planetall.com; Nov. 14, 1997, 19 pgs.
PlanetAll; Cardwell, Annette; •CYBERSCENE PlanetAll Keeps You in Touch, Boston Herald, Dec. 6, 1996, Proquest #17350285.
Planned Maintenance Program, "What is PMP?", www.followup.com, Apr. 15, 1997 [retrieved Jun. 26, 2002], pp. 1-4, retrieved from: Google.com and archive.org.
Rafter, "10 Companies to Watch: Epinions.Com," The Industry Standard Magazine, dated Jan. 17, 2000 (3 pages printed from TheStandard.com website).
Sheff, David, "Mr. Satisfaction", Los Angelos Times, Oct. 13, 1996 [retrieved Oct. 28, 2005], pp. 1-5, retrieved from: Proquest Direct.
Tedeschi, Bob. "Consumer Products are Being Reviewed on More Web Sites, Some Featuring Comments From Anyone With an Opinion." (Full Text Version) New York Times, Late Edition—Final ED, col. 1, p. 16, Oct. 25, 1999.
UU: Carrol, Matt: "Can't Keep Track of Your Friends? A Cambridge Firm Will," Boston Globe, Jan. 4, 1998, Proquest #25464125.
W. Andrews, "Building Communities as Way of Building Sales," Web Week, vol. 2, Issue 20, Dec. 16, 1996 (2 pages).
Waddington, Alan: "Mail Order Inventory Control": 1983.
Watt, Peggy; Internet Article; Varied Collaborative Approaches Entice Intranet Users: Network World, Apr. 21, 1997; ProQuest #11525439.
Wohl, Amy. "User Review—Your Opinions are Highly Valued on the Web." VarBusiness, No. 1528, p. 69, Nov. 8, 1999.
Dialog Srch No Reviews Jun. 27, 2012; Dialog search for documentation re: finding catalog items having no reviews; Jun. 27, 2012;
Dialog Srch Threshold Reviews: Dialog search for documentation re: finding catalog items having less than a threshold number of reviews; Jun. 27, 2012.
Hibbard, Justin, "Collaborative filtering brings human input to information retrieval in the enterprise," Information Week, News in Review, http://www.informationweek.com/662/62ivadd.htm, Jul. 9, 2012.

* cited by examiner

| FIG. 2A-1 | FIG. 2A-2 |

First Customer Reviews
Home  Your First Reviews  Leaderboard  Most Helpful First Reviews  First Review Candidates  Discussions

Monthly Top First Reviewers (Write first reviews, compete, earn badges)
(The customer to earned the most recent First Review points every month)

April 2007
Customer Name
1,234 points in April
> See all 123 First Reviews

March 2007
Customer Name
1,134 points in March
> See all 123 First Reviews

February 2007
Customer Name
834 points in February
> See all 123 First Reviews

> See all Top First Reviewers

Customers have earned these badges....
Bronze — ★FIRST REVIEWER — 1,234 Customers
Silver — ★ FIRST REVIEWER — 234 Customers
Gold — ★ FIRST REVIEWER — 123 Customers
Top First Reviewer — ★TOP FIRST REVIEWER — 83 Customers (Lifetime)

First Reviews Leaderboard
(Customers who earned First Review points within the last 90 days)

| Rank | Last | Customer | Cur. Points | 1st Reviews | Helpfulness |
|---|---|---|---|---|---|
| #1 | ▲3 | Customer Name<br>> See all 123 First Reviews | 1,345 | 135 | 78% |
| #2 | ▼1 | Customer Name<br>> See all 123 First Reviews | 845 | 85 | 56% |
| #3 | ▼2 | Customer Name<br>> See all 123 First Reviews | 745 | 45 | 89% |
| #4 | ▲15 | Customer Name<br>> See all 123 First Reviews | 545 | 55 | 66% |
| #5 | ▲17 | Customer Name<br>> See all 123 First Reviews | 345 | 35 | 56% |
| #6 | ▲28 | Customer Name<br>> See all 123 First Reviews | 245 | 25 | 78% |
| #7 | ▼5 | Customer Name<br>> See all 123 First Reviews | 123 | 113 | 35% |
| #8 | ▼4 | Customer Name<br>> See all 123 First Reviews | 120 | 20 | 46% |
| #9 | ▲26 | Customer Name<br>> See all 123 First Reviews | 119 | 19 | 67% |
| #10 | ▼8 | Customer Name<br>> See all 123 First Reviews | 107 | 17 | 77% |

> See all 1,234 active First Reviewers

Most Helpful First Reviews
(First Reviews that other customers found particularly helpful)

Product Title Goes Here
by Name (binding)

★★★★★ The string theorists were scammed!
April 1, 2008 by Peter W. Shor
The part of the book I found most was the part which tells how the string theorists were scammed by Nature (or

Want to play?
If you're not Chris Customer, click here

This month — 0 points (0 lifetime)
This month — Not ranked yet

Badges
Bronze — ★FIRST REVIEWER — 0/10 points
Silver — ★FIRST REVIEWER — 0/100 points
Gold — ★FIRST REVIEWER — 0/500 points
Top First Reviewer — ★TOP FIRST REVIEWER — Ranked top 10 last month > Your First Reviews
After you post your First Reviews, check back to see how they are doing. Other customers will judge how helpful your reviews are. You will get 1 point for helpful comments and lose 1 point for unhelpful ones.

First Review Candidates
For You    (Based on your past purchases, more....)    See all...

FIG. 2A-2

Mathematics). Of course, Smolin doesn't exactly like this, but imagine the following conversation.String theorists: We've got Standard Model, and it works great, but it doesn't include gravity, and it doesn't lots of other stuff, like why all the...

First review: 10 points
Customer votes:
123 helpful-10 unhelpful =113 points
Peter has earned: 123 points Product Title Goes Here
by Name (binding)

★★★☆☆ The string theorists were scammed!
April 1, 2008 by Peter W. Shor
The part of the book I found most was the part which tells how the string theorists were scammed by Nature (or Mathematics). Of course, Smolin doesn't exactly like this, but imagine the following conversation.String theorists: We've got Standard Model, and it works great, but it doesn't include gravity, and it doesn't lots of other stuff, like why all the...

First review: 10 points
Customer votes:
123 helpful-10 unhelpful =113 points
Peter has earned: 123 points > See more Spotlight First Reviews

⎬ 208

What's this?
Acme.com adds new products every day. We know customers love customer reviews, so we want to reward those who help us out. Acme.com will give you points towards badges that appear above your reviews as well as Your Profile Page.

To make sure everyone plays fair, points will be awarded and taken away based on customer feedback. In other words, helpfulness votes will weigh heavily in how many points you earn.

You can earn points toward a bronze, silver, and gold star badge. This is your own personal badge. Additionally you can work toward a "Top First Reviewer" badge. Every month we calculate which customers earned the most points. All customers in the top 10 will earn the "Top First Reviewer" badge and credited on the "Top First Reviewers" page.

Since everyone wants to play fair and fun games we may need to change the rules of the game from time to time.

First Review discussions

| Discussions | Posts | Last post |
|---|---|---|
| How come I lost my badge? | 3 | 12 minutes ago |
| I finally passed Chris Customer this month! | 1 | 32 minutes ago |
| A note to all noobs | 12 | 4 hours ago |
| There's only so many steak knives I can review | 3 | 10 hours ago |
| I've got an idea... | 3 | 2 days ago |
| Found a great store in Amazon for first reviews | 1 | 3 days ago |
| Ha ha I reviewed HP7 first! | 12 | 5 days ago |
| Chris Customer is a hack reviewer | 3 | 10 days ago |
| I want more badges | 12 | 13 days ago |
| Found the mother lode! | 3 | Feb 2007 |

> See all 123 discussions...

⎬ 214

10 points

Product Title Goes Here
by Name (binding)

Write a first review

⎬ 220

Find First Review Candidates
Browse First Review Candidates
lorem  ipsum  dolor  sit  amet  consectetuer  adipiscing  elit  nunc magna  euismod sed  pellentesque quis scelerisque id  nibh sit amet lacus aliquam rhoncus tempor  enim Do these look familiar? These categories are based on products  Recommended for You
Search First Review Candidates

⎬ 222

⎬ 224

Bonus Point First Reviews
(Know any of these? Review them for extra points)

20 points

Product Title Goes Here
by Name (binding)

Write a first review

First Customer Reviews Leaderboard

Home | Your First Reviews | Leaderboard | Most Helpful First Reviews | First Review Candidates | Discussions Showing 1-30 of 12,345 First Reviewers
Customers who earned First Review points within the last 90 days

| Rank | Last | Customer | 1st Reviews | Reviews Points | Helpful Votes | Unhelpful Votes | Helpfulness | Cur. Points |
|------|------|----------|-------------|----------------|---------------|-----------------|-------------|-------------|
| #1 | ▲3 | Customer Name > See all 123 First Reviews | 135 | 135 | 135 | 135 | 78% | 1,345 |
| #2 | ▼1 | Customer Name > See all 123 First Reviews | 85 | 85 | 85 | 85 | 56% | 845 |
| #3 | ▼2 | Customer Name > See all 123 First Reviews | 45 | 45 | 45 | 45 | 89% | 745 |
| #4 | ▲15 | Customer Name > See all 123 First Reviews | 55 | 55 | 55 | 55 | 66% | 545 |
| #5 | ▲17 | Customer Name > See all 123 First Reviews | 35 | 35 | 35 | 35 | 56% | 345 |
| #6 | ▲28 | Customer Name > See all 123 First Reviews | 25 | 25 | 25 | 25 | 78% | 245 |
| #7 | ▼5 | Customer Name > See all 123 First Reviews | 113 | 113 | 113 | 113 | 35% | 123 |
| #8 | ▼4 | Customer Name > See all 123 First Reviews | 20 | 20 | 20 | 20 | 46% | 120 |
| #9 | ▲26 | Customer Name > See all 123 First Reviews | 19 | 19 | 19 | 19 | 67% | 119 |
| #10 | ▼8 | Customer Name > See all 123 First Reviews | 17 | 17 | 17 | 17 | 77% | 107 |
| #11 | ▲3 | Customer Name > See all 123 First Reviews | 135 | 135 | 135 | 135 | 78% | 1,345 |
| #12 | ▼1 | Customer Name > See all 123 First Reviews | 85 | 85 | 85 | 85 | 56% | 845 |
| #13 | ▼2 | Customer Name > See all 123 First Reviews | 45 | 45 | 45 | 45 | 89% | 745 |

302

Monthly Top First Reviewers
(The customer to earned the most recent First Review points every month)

See all Top First Reviewers from... [last 12 months ▼]

April 2007
Customer Name
1,234 points in April
> See all 123 First Reviews

March 2007
Customer Name
1,134 points in March
> See all 123 First Reviews

February 2007
Customer Name
834 points in February
> See all 123 First Reviews

January 2007
Customer Name
1,234 points in April
> See all 123 First Reviews

December 2006
Customer Name
1,134 points in March
> See all 123 First Reviews

November 2006
Customer Name
834 points in February
> See all 123 First Reviews

304

| FIG. 4A-1 | FIG. 4A-2 | FIG. 4A-3 |

Web Page | Chris's Page | all

Search [ ] A9 Search

Your Account | Cart | Lists | History | Help

Most Helpful First Reviews

Home   Your First Reviews   Leaderboard   Most Helpful First Reviews   First Review Candidates   Discussions Showing 1-12 of 1,234 Recently Helpful First Reviews
First reviews that have earned the most points within the last 90 days

*402*

Product Title Goes Here
by Name (binding)

Peter earned:
123 points

First Review: 10
Helpful customer votes +123
Unhelpful customer votes -10

★★★☆☆ The string theorists were scammed! April 1, 2008 by Peter W. Shor
The part of the book I found most interesting was the part which tells how the string theorists were scammed by Nature (or Mathematics). Of course, Smolin doesn't put it exactly like this, but imagine the following conversation. String theorists: We've got the Standard Model, and it works great, but it doesn't include gravity, and it doesn't explain lots of other stuff, like why all the...
Read the full review.

Product Title Goes Here
by Name (binding)

Peter earned:
122 points

First Review: 10
Helpful customer votes +123
Unhelpful customer votes -10

★★★☆☆ The string theorists were scammed! April 1, 2008 by Peter W. Shor
The part of the book I found most interesting was the part which tells how the string theorists were scammed by Nature (or Mathematics). Of course, Smolin doesn't put it exactly like this, but imagine the following conversation. String theorists: We've got the Standard Model, and it works great, but it doesn't include gravity, and it doesn't explain lots of other stuff, like why all the...
Read the full review.

Most Helpful First Reviewers
(Customers with the most helpful votes on their First Reviews this month)

*404*

Customer Name
123 helpful votes
> See all 123 First Reviews

Customer Name
122 helpful votes
> See all 123 First Reviews

Customer Name
121 helpful votes
> See all 123 First Reviews

Customer Name
120 helpful votes
> See all 123 First Reviews

Customer Name
119 helpful votes
> See all 123 First Reviews

Customer Name
118 helpful votes
> See all 123 First Reviews

Product Title Goes Here
by Name (binding)

Peter earned:  First Review           10
118 points     Helpful customer votes  +123
               Unhelpful customer votes -10

★★★☆☆ The string theorists were scammed! April 1, 2008 by Peter W. Shor
The part of the book I found most interesting was the part which tells how the string theorists were scammed by Nature (or Mathematics). Of course, Smolin doesn't put it exactly like this, but imagine the following conversation. String theorists: We've got the Standard Model, and it works great, but it doesn't include gravity, and it doesn't explain lots of other stuff, like why all the...
Read the full review.

1  2  3  4  5  6  7  8  9  10       ... 123

| FIG. 5A-1 | FIG. 5A-2 | FIG. 5A-3 |

Your Account | Cart | Lists | History | Help

Web Page | Chris's Page

Search [ all ▼ ] [          ] A9 Search

Your First Customer Reviews

Home | Your First Reviews | Leaderboard | Most Helpful First Reviews | First Review Candidates | Discussions

Your Progress
If you're not Chris Customer, click here

This month: 123 points (128 lifetime)

This month Rank: #23 (Best:#12 Apr 2007)

Badges
✓ Bronze ★ FIRST REVIEWER 10/10 points
✓ Silver ★ FIRST REVIEWER 100/100 points
✓ Gold ★ FIRST REVIEWER 123/500 points
✓ Top First Reviewer ★ TOP FIRST REVIEWER Ranked top 10 last month

518

Ready to write a First Review?

First Review Candidates For You (Based on your past purchases, more....)  See all....

10 points
Product Title Goes Here by Name (binding)
[write a first review]

20 points
Product Title Goes Here by Name (binding)
[write a first review]

10 points
Product Title Goes Here by Name (binding)
[write a first review]

1 2 3 4 5
10 points
Product Title Goes Here by Name (binding)
[write a first review]

520

Browse First Review Candidates lorem ipsum dolor sit amet consectetuer adipiscing elit nunc magna
sed pellentesque quis scelerisque id nibh in sit amet lacus aliquam rhoncus tempor enim euismod Do these look familiar? These categories are based on products Recommended for You

522

Search First Review Candidates
[                    ]

524

You on the Leaderboard
(Customers who earned First Review points within the last 90 days)

FIG. 5A-2

Your First Review Points

| | First Review Pts | Help. Votes | Unhelp. Votes | Total Points |
|---|---|---|---|---|
| Product Title Goes Here by Name (binding) ★★★★☆ > See Review | 10 | +12 | -3 | 123 points |
| Product Title Goes Here by Name (binding) ★★★★☆ > See Review | 10 | +12 | -3 | 123 points |
| Product Title Goes Here by Name (binding) ★★★★☆ > See Review | 10 | +12 | -3 | 123 points |
| Product Title Goes Here by Name (binding) ★★★★☆ > See Review | 10 | +12 | -3 | 123 points |
| Product Title Goes Here by Name (binding) ★★★★☆ > See Review | 10 | +12 | -3 | 123 points |
| > See all Your 123 First Reviews | | | | 1,234 points |

502

21 Customer Name
321 recent points (12,345 lifetime)
> See all 123 First Reviews

22 Customer Name
213 recent points (12,345 lifetime)
> See all 123 First Reviews

23 Chris Customer
123 recent points (12,345 lifetime)
> See all 123 First Reviews

24 Customer Name
103 recent points (12,345 lifetime)
> See all 123 First Reviews

25 Customer Name
98 recent points (12,345 lifetime)
> See all 123 First Reviews > See all 1,234 active First Reviewers

Your Rank History

April 2007   Rank #38
             1,234 points in April

Your Rank History

Home  Your First Reviews  Leaderboard  Most Helpful First Reviews  First Review Candidates  Discussions Show: [last 12 months ▼] ○

| | 1st Reviews | Reviews Points | Helpful Votes | Unhelpful Votes | Helpfulness | Cur. Points |
|---|---|---|---|---|---|---|
| April 2007 | Rank #123 | 135 | 135 | 135 | 78% | 1,345 |
| March 2007 | Rank #123 | 85 | 85 | 85 | 56% | 845 |
| February 2007 | Rank #123 | 45 | 45 | 45 | 89% | 745 |
| January 2007 | Rank #123 | 55 | 55 | 55 | 66% | 545 |
| December 2006 | Rank #123 | 35 | 35 | 35 | 56% | 345 |

> Your First Reviews

First Review Candidates For You (Based on your past purchases, more...) See all...

▲
[10 points]
▼

Product Title Goes Here by Name (binding)
(Write a first review)

Find First Review Candidates
Browse First Review Candidates

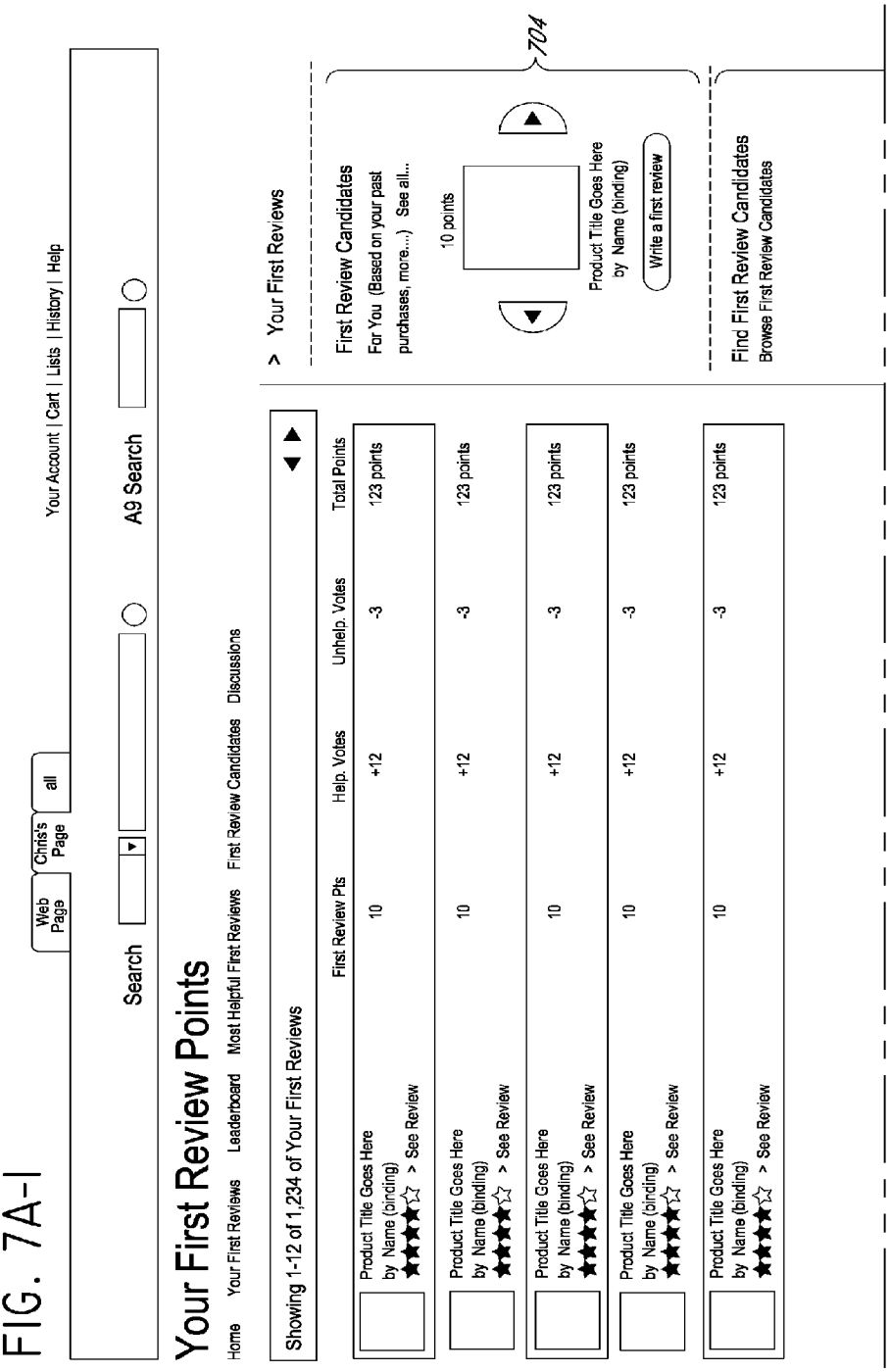
FIG. 7A-I

First Review Candidates

Home    Your First Reviews    Leaderboard    Most Helpful First Reviews    First Review Candidates    Discussions Search First Review Candidates:

Showing 1-24 of 1,234 Bonus Point First Review Candidates — *802*

| 20 points | 20 points | 30 points | 20 points |
|---|---|---|---|
| Product Title Goes Here by Name (binding) | Product Title Goes Here by Name (binding) | Product Title Goes Here by Name (binding) | Product Title Goes Here by Name (binding) |
| (Write a first review) | (Write a first review) | (Write a first review) | (Write a first review) |

| 20 points | 20 points | 30 points | 20 points |
|---|---|---|---|
| Product Title Goes Here by Name (binding) | Product Title Goes Here by Name (binding) | Product Title Goes Here by Name (binding) | Product Title Goes Here by Name (binding) |
| (Write a first review) | (Write a first review) | (Write a first review) | (Write a first review) |

*806* — Bonus point First Reviews

Candidates Recommended for You

*804* — Browse First Review Candidates lorem  ipsum  dolor  sit  amet  consectetuer  adipiscing  elit  nunc magna  euismod sed  pellentesque quis  scelerisque id  nibh  in sit amet  lacus aliquam rhoncus tempor  enim Do these look familiar? These categories are based on products Recommended for You

| FIG. 9A-1 | FIG. 9A-2 | FIG. 9A-3 |

Web Page | Chris's Page | all

Your Account | Cart | Lists | History | Help

Search [  ▼  ]    [        ]    A9 Search

First Review Discussions

Home   Your First Reviews   Leaderboard   Most Helpful First Reviews   First Review Candidates   Discussions Showing 1-24 of 1,234 First Review Discussions

| Discussions | Posts | Last post |
|---|---|---|
| | ▲ | ▼ |
| How come I lost my badge? | 3 | 12 minutes ago |
| I finally passed Chris Customer this month! | 1 | 32 minutes ago |
| A note to all noobs | 12 | 4 hours ago |
| There's only so many steak knives I can review | 3 | 10 hours ago |
| I've got an idea.... | 3 | 2 days ago |
| Found a great store in Amazon for first reviews | 1 | 3 days ago |
| Ha ha! reviewed HP7 first! | 12 | 5 days ago |
| Chris Customer is a hack reviewer | 3 | 10 days ago |
| I want more badges | 12 | 13 days ago |

Monthly Top First Reviewers ⎫
(The customer to earned the most recent ⎪
First Review points every month) ⎪
⎪
April 2007 ⎪
[img] Customer Name ⎪
1,234 points in April ⎪
> See all 123 First Reviews ⎪
⎬ 904
March 2007 ⎪
[img] Customer Name ⎪
1,134 points in March ⎪
> See all 123 First Reviews ⎪
⎪
February 2007 ⎪
[img] Customer Name ⎪
834 points in February ⎪
> See all 123 First Reviews ⎪
⎪
> See all Top First Reviewers ⎭

FIG. 9A-2

| | | |
|---|---|---|
| Found the mother lode! | 3 | Feb 2007 |
| How come I lost my badge? | 3 | Feb 2007 |
| I finally passed Chris Customer this month! | 1 | Feb 2007 |
| A note to all noobs | 12 | Feb 2007 |
| There's only so many steak knives I can review | 3 | Feb 2007 |
| I've got an idea.... | 3 | Feb 2007 |
| Found a great store in Amazon for first reviews | 1 | Feb 2007 |
| Ha ha I reviewed HP7 first! | 12 | Feb 2007 |
| Chris Customer is a hack reviewer | 3 | Feb 2007 |
| I want more badges | 12 | Feb 2007 |
| Found the mother lode! | 3 | Feb 2007 |
| Ha ha I reviewed HP7 first! | 12 | Feb 2007 |
| Chris Customer is a hack reviewer | 3 | Feb 2007 |
| I want more badges | 12 | Feb 2007 |
| Found the mother lode! | 3 | Feb 2007 |

1 2 3 4 5 6 7 8 9 10 ... 123

902

Most Helpful First Reviews
(First Reviews that other customers found particularly helpful)

[Product Title Goes Here by Name (binding)]

★★★★☆ The string theorists were scammed!
April 1, 2008 by Peter W. Shor

The part of the book I found most interesting was the part which tells how the string theorists were scammed by Nature (or Mathematics). Of course, Smolin doesn't put it exactly like this, but imagine the following conversation. String theorists: We've got the Standard Model, and it works great, but it doesn't include gravity, and it doesn't explain lots of other stuff, like why all the...

First review: 10 points
Customer votes: 123 helpful - 10 unhelpful = 113 points
Peter has earned: 123 points

[Product Title Goes Here by Name (binding)]

★★★☆☆ The string theorists were scammed!
April 1, 2008 by Peter W. Shor

The part of the book I found most interesting was the part which tells how the string theorists were scammed by Nature (or Mathematics). Of course, Smolin doesn't put it exactly like this, but imagine the following conversation.String theorists: We've got the Standard Model, and it works great, but it doesn't include gravity, and it doesn't explain lots of other stuff, like why all the...

First review: 10 points
Customer votes: 123 helpful -
10 unhelpful = 113 points
Peter has earned: 123 points > See more Spotlight First Reviews

| FIG. 12A-1 | FIG. 12A-2 | FIG. 12A-3 | FIG. 12A-4 | FIG. 12A-5 | FIG. 12A-6 |
|---|---|---|---|---|---|

FIG. 12

Product Details

Product Dimensions: 6.6x7.1x2.6 inches; 6 pounds
Shipping Weight: 6 pounds (View shipping rates and policies)
Shipping: Currently, item can be shipped only within the U.S.
ASIN: B000NUKK84
Item model number: DPP-FP90
Average Customer Review: ★★★★★ based on 1 review. (Write a review.)
Vendor.com Sales Rank:#27,188 in Electronics (See Bestsellers in Electronics)
Date first available at Vendor.com: July 2, 2004

Would you like to upgrade product info or give feedback on images? (We'll ask you to sign in so we can get back to you) 1204   1206

---

Select Accessories for This Item

Sony Picture Station DPP-FP90 4x6 Photo Printer
In Stock and eligible for FREE Super Saver Shipping.         $149.95

---

☐ Software

Adobe Photoshop Elements 5.0
In Stock and eligible for FREE Super Saver Shipping $69.95 $69.95

QuickBooks Pro 2007 Small
In Stock and eligible for FREE Super Saver Shipping $199.95 $149.95

Microsoft Office Home and Student 2007
In Stock and eligible for FREE Super Saver Shipping $149.95 $119.95

FIG. 12A-2

Tags customers associate with similar products (What's this?)
Click on a tag to find related items, dicussions, and people.

Check the boxes next to these popular tags or enter your own tags in the field below ☐ photo printer (48)    ☐ pixma (8)    ☐ picturemate deluxe (3)
☐ printer (13)          ☐ canon selphy cp730 photo printer (3)    ☐ selphy (3)
☐ picture mate (8)      ☐ sony w80 (3)    ☐ canon photo printer (3)
☐ canon (9)             ☐ canon selphy cp720 photo printer (5)

Your tags: [____] (Add)   — 1208
(Press the "T" key twice to quickly access the "Tag this product" window.)

Help others find this product - tag it for Vendor search

No one has tagged this product for Vendor search yet. Why not be the first to suggest a search for which it should appear?

Search Products Tagged with [_____] (GO)

>See most popular Tags

FIG. 12A-3

Rate this item to improve your recommendations

Rate this item ⎯ 1210
★★★★★ ☐ I own it

Customer Reviews

1 Review

| | | |
|---|---|---|
| 5 star: | ▒▒▒ (1) | Average Customer Review |
| 4 star: | (0) | ★★★★★ (1 customer review) |
| 3 star: | (0) | |
| 2 star: | (0) | |
| 1 star: | (0) | |

Share your thoughts with other customers:
[Write your own review]

Customer Reviews

Most Helpful Customer Reviews

★★★★★ Mark, August 27, 2007
By Mark Doe (California) - See all my reviews
[REAL NAME]

Great product.

☐ (Comment | Was this review helpful to you?
[Yes] [No] (Report this)
[Write your own review] ⎯ 1212
> See all customer images...

Search Customer Reviews
[_____] [GO]
☑ Only search this product's reviews

Advertisement

FIG. 12A-4

Customer Discussions Beta (What's this?)
New! Receive e-mail when new posts are made. Click the "Track it!" button on any discussion page.

This product's forum (0 discussions)

| Discussion | Replies | Latest Post |
|---|---|---|

No discussions yet

Ask questions, Share opinions, Gain insight

Start a new discussion

Topic: _____ — 1214

---

Product Information from the Amapedia Community Beta (What's this ?)

Be the first person to add an article about this item at Amapedia.com. — 1216

> See featured Amapedia.com articles

---

Listmania!

Christmas List: A list by Jane Doe

HD-DVD: A list by John Smith electronics: A list by Bob Jones

Create a Listmania! list — 1218

Search Listmania [_____] GO

METHODS AND SYSTEMS FOR SEARCHING FOR AND IDENTIFYING DATA REPOSITORY DEFICITS

CROSS-REFERENCE TO RELATED APPLICATIONS

This application is a continuation of U.S. patent application Ser. No. 13/196,799, filed Aug. 2, 2011, which is a continuation of U.S. patent application Ser. No. 11/864,521, filed Sep. 28, 2007, now U.S. Pat. No. 8,001,003, the contents of which are incorporated herein in their entirety.

BACKGROUND

Description of the Related Art

Certain conventional online systems maintain various kinds of databases, including records for various item types. One drawback of conventional online systems is that typically many items or categories of items may have unpopulated record fields, depriving others of access to such information.

BRIEF DESCRIPTION OF THE DRAWINGS

Example embodiments will now be described with reference to the drawings summarized below. These drawings and the associated description are provided to illustrate particular example embodiments and implementations, and not to limit the scope of the invention.

FIGS. 2-9 illustrate example user interfaces.

FIG. 12 (including FIGS. 12A1-6) illustrates another example user interface.

DETAILED DESCRIPTION OF PREFERRED EMBODIMENTS

Figure 1:
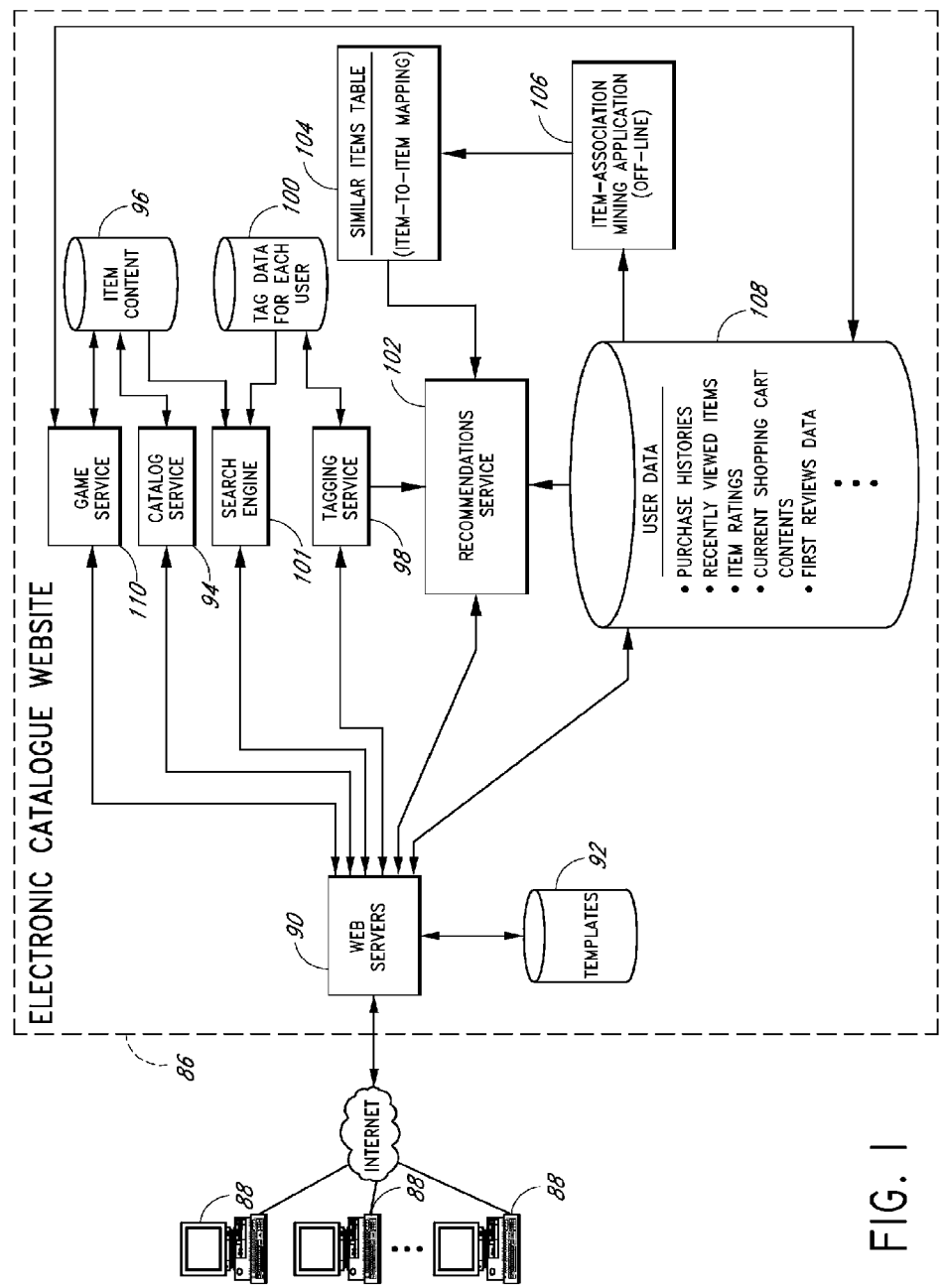
FIG. 1 illustrates a web site system that implements services described herein, and illustrates the flow of information between components of the system.

Various features and methods will now be described in the context of a system and a set of services used to identify database records having a paucity of certain types of data. By way of illustration, the database records may be associated with products or services, and the deficiency in data may be product or service reviews.

Certain example embodiments described herein search for and identify items in an interactive electronic catalogue that do not have an associated item review or are missing other desirable information. Such items are identified to certain users and such users are prompted or otherwise encouraged to submit the missing information. For example, users may participate in an information submission game, where users may be assigned points for submitting certain types of information for an item. Additional points are optionally assigned for a given submission based on the number of votes from other users indicating that the helpfulness and/or accuracy of the submitted information. Points are optionally subtracted based on the number of votes from other users indicating that the submission is not helpful and/or inaccurate. Optionally, a cap is provided on the number of points a given information submission can be awarded. Optionally, a floor is provided with respect how low a point score an information submission may receive.

Certain example embodiments track information submission scores for a plurality of users and using such information, assign rankings and/or titles (such as badges). Certain example embodiments provide user interfaces that display information on a first review online game, including player rankings, titles/badges, top player(s) in a given period of time, players having submitted the most or more helpful information.

By way of example, the information submission may be a review in the form of a textual review, a point review (which may be in the form of a number of stars), a grade review, an icon review (e.g., happy or sad face), an audio review (e.g., recorded live or submitted as an audio file, such as an MP3, ACC, OGG, WAV, AC3, WMA, or other file format), a video review (e.g., recorded live, or submitted as an MPEG, Flash, WMV, AVI, or other file format, and optionally including an audio component), and/or other form of review. The items/products may, for example, include physical products that are shipped to users, digital products that are downloaded or transmitted to users, and/or services provided to users. As will be recognized, the disclosed methods are also applicable to other types of items, such as authors, musical artists, users, businesses, brands, web sites, web pages, user communities, chat rooms, blogs, etc.

Throughout the description, the term "product" will be used to refer generally to both an actual product (e.g., an Acme Widget) and to its record or description in a computer data repository. A more specific meaning may be implied by context. The more general term "item" will be used in the same manner.

While the following description may refer to incentivizing or motivating users to submit first product reviews, the processes and systems discussed herein can be used to incentivize or motivate users to perform other actions, such as submitting reviews generally, submitting tags, providing votes as to the quality or helpfulness/unhelpfulness of reviews or other submissions, submitting pictures of products, submitting product catalogs, submitting product manuals, submitting guides, submitting articles, participating in an online discussion, updating product information, recommending accessories (e.g., products that can be used with a given item, such as ink for a printer, batteries for an electronic toy, memory cards for cameras, software for computers, service contracts for electronic products, phone service for a cellular phone, etc.), providing recommendations as to similar alternate products, submitting useful software programs or widgets, adding information or corrections to a wiki/collaborative website, participating in a forum, etc.

To facilitate an understanding of the specific embodiments described below, an overview will initially be provided of an example web site system. Throughout the description, reference will be made to various implementation-specific details of this system. These details are provided in order to fully illustrate specific embodiments, and not to limit the scope of the invention.

In this particular embodiment, the web site system ("web site") comprises functionality for users to search, browse, and make purchases from an interactive electronic catalog of products, such as book titles, music titles, video/DVD titles, and electronics products over the Internet, or other network, and to provide reviews for items in the catalog. The web site may also provide functionality for renting products (such as software, DVDs or downloaded movies or music), for listing products for sale in an online marketplace, and/or for performing other types of product-related actions. The various products are optionally arranged within a hierarchical browse structure or "browse tree" in which a node represents a product category or subcategory.

Detailed information about a product can be obtained by accessing that product's detail page. As used herein, a "detail page" is a page that predominantly contains information about a particular product or other item. In a particular example embodiment, a product detail page may comprise a description, picture, and price of the product, customer reviews of the product (if any have been submitted) and a listing of helpful/unhelpful review votes, lists of related products, and information about the product's availability from one or more sellers. When an audio or video review is posted on a detail page, optionally playback controls (e.g., play, pause, rewind, fast forward, increase volume, decrease volume, etc.) are provided as well. When a video review is posted on an item page, optionally a still (e.g., the first frame) from the video review is statically displayed prior to the user activating a playback control. Optionally, a textual title submitted by a user in association with a video or audio review may be displayed as well. The product detail pages may also provide functionality for users to perform such actions as purchasing the product, creating a listing for selling the product, submitting a product review, voting on a product review, and/or adding the product to a personal shopping cart, wish list, or rental queue.

The product detail pages, and/or other pages of the web site, optionally also include elements for users to assign tags (e.g., a keyword or category label) to particular products. These tags may be used for various purposes, including obtaining product recommendations that are specific to user-definable product categories, interests, and contexts. In one embodiment, users can also obtain personalized recommendations without tagging any products; these recommendations may be based on the target user's purchase history, rental history, item viewing history, first reviews for products submitted by the user, other product reviews submitted by the user, and/or product ratings.

The recommendations provided by the web site are generated by a recommendation service or "engine" that, may for example, accept an input list of items (e.g., product IDs), and returns an output list of items that are deemed to be collectively similar or related to the items on the input list. The recommendation service may also optionally take into consideration information about the known or predicted affinity the user has for particular items on the input list. For example, if a user provided a review on an item (optionally even if there is no record on the system of a purchase of the item by the user), other similar products or products purchased by other users that purchased the reviewed product may be recommended to the user. Products that the user provided first reviews on may be weighted more heavily in determining an affinity and providing recommendations then products where the user provided a review but did not provide the first review.

Further, the content of the review provided by the user (e.g., the point rating or a text rating parsed by the system) may be used in determining what products to recommend to the user. For example, if the user rated one item on the input list highly, and gave an average rating or no rating to another item, the highly rated item may be given more weight. Examples of methods and data structures that may be used to implement the recommendations service are described in U.S. Pat. No. 6,912,505, the disclosure of which is hereby incorporated by reference.

It has been observed that users are more likely to purchase products that have associated reviews available. User written reviews often give other users a more credible evaluation of a product than the description provided by the product manufacturer or distributor. Thus, a significant increase in sales may occur upon the presence of even a single positive review. Further, the existence of at least one review may encourage others to submit reviews. Thus, in order to encourage users to submit reviews for products or other items where no reviews have yet been submitted and accepted, certain example embodiments identify which products have not yet been reviewed and/or have less than a certain number of reviews. The system may then encourage or incentivize users to submit reviews for such products. This is enables the system to better ensure that review coverage is provided for a larger number and distribution of products and product types.

By way of example, a game or contest may be provided wherein the submission of initial reviews (also referred to as first reviews) for a product or other item may result in the user being rewarded or otherwise recognized, thereby providing an incentive to participate and play. Optionally, a user is entered into the game automatically upon submission of a review by the user. Optionally, a user can opt in or out of the game via an account maintenance Web page or otherwise. If the user opts out of the game, the system does not display the user's first review game ranking or badges, and optionally, the user's first reviews are not considered in assigning rankings to other users play the game.

In an example review game, a user may be given a certain number of points for each review the user submits that is the first review for the corresponding product. The user may be enabled to compete against himself/herself, wherein if the user achieves certain point levels the user is assigned a certain designation (e.g., a title/badge) that indicates such achievement. For example, if the user reaches a first number of points (e.g., 40 points), the user is assigned a first title (e.g., bronze medal winner). If the user reaches a second number of points (e.g., 100 points), the user is assigned a second title (e.g., silver medal winner). If the user reaches a third number of points (e.g., 500 points), the user is assigned a third title (e.g., gold medal winner). If the user reaches a fourth number of points (e.g., 2000 points), the user is assigned a fourth title (e.g., platinum medal winner), and so on. Optionally, the user's points may be reset to zero or other number periodically (e.g., every three months), and the user would need to earn new points in order to achieve the title or badge. Other titles or badges may be assigned to a user based on the number of first reviews submitted by the user or based on other first review parameters.

In addition or instead, a user can compete with other users participating in the first review game. For example, a user can compete with other users based on the relative number of points, titles, badges, and/or other forms of recognition (e.g., having a review highlighted on a helpful review Web page or designated as a most helpful first review) they acquire. A list of first review submitters can be presented in order of their point rankings and/or titles. The rankings and/or titles can be displayed in association with a ranked list entry. For example, a listing entry can include some or all of the following:

current ranking;

previous ranking (e.g., during a specified period, such as the previous week, month, and/or year);

a graphic indicating a trend or change in ranking (e.g., indicating whether the ranking has improved from a previous period, gotten worse, or is unchanged);

a title/badge (e.g., best first reviewer, top 10 first reviewer, top first reviewer within a specified period of time (e.g., today, this week, this month, last 90 days, this year, etc.));

a user name (which may be the user's actual name, or a pseudo name/nickname);

the total current points for the user's first reviews (which may be restricted to points received within a specified period of time, such as the previous 90 days or 1 month);

the number of first reviews for products submitted by the user;

a helpfulness or usefulness score (e.g., a percentage of the total helpful/not-helpful votes for the user's first product reviews that indicate the reviews are helpful, and/or a tally of the number of helpful votes submitted by others for the user's first reviews within a specified time period, optionally with points detracted for unhelpful votes);

number of first reviews submitted by the user.

Optionally, some or all of the foregoing information is updated in substantially real time. Optionally, the list can be sorted based on one or more of the entry information types (e.g., based on ranking, badges, helpfulness score, number of reviews, etc.).

The rankings, titles, badges, trend indicators, and/or other information will often motivate users to improve their ranking, title, badge, and/or ranking performance trend. Information is optionally provided to users indicating how they can improve their ranking, title, badge, and/or ranking performance trend. Optionally, the ranking and title assignment process and criteria are explicitly disclosed to users so as to provide transparency with respect to scoring, ranking, and the assignment of titles.

A user can be provided with notifications (e.g., via email, Short Message Service (SMS), instant messaging, a Web page, or otherwise) when a significant event has occurred with respect to their ranking, title, badge, or trend or that of other users. Optionally, the user can specify via an account setup Web page the type of notifications that are to be provided and how the notifications are to be provided. For example, the notifications can be triggered by one or more of the following events:

change in the user's ranking;
change in the user's title;
change in another specified user's ranking;
change in another specified user's title;
surpassing another specified user's ranking;
being surpassed by another specified user's ranking;
reaching a specified number of points;
dropping below a specified number of points;
change in the number and/or percentage of helpful votes for the user's first reviews;
a user review score falls to a certain level (e.g., 0 points);
a determination that an item purchased by the user does not have any reviews on the item web page;
availability of bonus points for submitting a first product review for a specified product or class of products (e.g., underwear).

Review requests can also be transmitted to users using techniques and processes described in U.S. Pat. No. 6,963,848, the content of which is incorporated herein by reference.

Points can be assigned to a user based solely on the number of first product reviews submitted by the user (optionally within a specified period of time, such as the previous 3 months, or within other specified period, such as the beginning of the second quarter to the previous day), or points can be based on additional or different considerations. For example, a user can be assigned a first number of points (e.g., 40 points) for submitting the first review for a product ("first product review"), an additional number of points (or fraction of a point) for each helpful vote received from other users regarding the helpfulness/usefulness of the review, and a negative number of points (or fraction of a point) for each not helpful or not useful vote received. The votes may be provided via an item Web page that displays the user's review and voting buttons (e.g., helpful/unhelpful, good/bad, etc.).

By way of further illustration, a "helpful" vote may have a value of "1," and a "not helpful" vote may have a value of "−1." For example, a reviewer with 100 "helpful" votes and 20 "not helpful" votes may have a tally or score of 80. In another embodiment, the tally may be based on only "helpful" or on only "not helpful" votes, or equivalents thereof. The "helpful" and "not helpful" votes may optionally be assigned different values. For example, a "helpful" vote may be assigned a value of "2" and a "not helpful" vote may be assigned a value of "−0.5," so that "helpful" votes are weighted more heavily than "not helpful" votes.

Optionally, the tally of votes/ratings given to anonymous reviews may be calculated differently from those given to non-anonymous reviews. In an example embodiment, a rating of a reviewer's anonymous review is given less weight then that of a rating of a non-anonymous review by the reviewer. For example, a "helpful" vote for a non-anonymous review by a given reviewer may be assigned a value of "2," while a "helpful" vote for an anonymous review by the given reviewer may be assigned a value of "1." Generally, this allows non-anonymous reviews and their authors to more easily attain higher scores or ratings than anonymous reviews, thereby encouraging reviewers to provide non-anonymous reviews, which generally appear more credible to readers.

Similarly, the tally of votes/ratings given to reviews by users that have been verified to have purchased the item being reviewed (e.g., by accessing a purchase history database record associated with the user or via a receipt provided by the user) may be calculated differently (e.g., have different weightings) from those given to users whose purchase or use of the item being reviewed has not been verified. Further example systems and methods for calculating a rating for a review that may be utilized are described in U.S. patent application Ser. No. 09/715,929, the disclosure of which is hereby incorporated by reference.

Optionally, if a user's review receives a certain number of negative reviews or the user's review score falls to a certain level (e.g., 0 points) as a result of negative reviews, the user is so notified (e.g., via a Web page, email, SMS/mobile phone message, or other communication). The notification may include a link to the user's review via which the user may edit the review to improve its quality. Optionally, guidelines may be provided on how the review can be improved (e.g., provide additional substantive details, use shorter sentences, compare to other similar products, do not be insulting, etc.). The guidelines may be generic, or may be selected based on an automated or manual analysis of the review text.

Optionally, bonus points (e.g., extra points, such as a specific number of points, or a point multiplier, such a doubling the points for a review submission and/or for each helpful votes) can be added or included in the user's scores for first product reviews for specified products and/or product classes. Such bonus points can be used to further encourage users to provide reviews for certain products or product classes that do not have any reviews or that are generally under-reviewed.

For example, if few reviews are submitted for undershirts, users can be notified (e.g., via email, SMS or other mobile phone communication, Web page, or otherwise) that bonus points will be awarded to a user that submits a first product review for an undershirt product generally or for a specific undershot product (e.g., having a specific SKU). The communication can optionally include a link to a corresponding product page, wherein a control is provided via which the user can submit a review (e.g., a first product review).

In an example embodiment, bonus points are automatically or manually awarded for product reviews submitted that meet the some are all of the following criteria:

the product has been offered via the system for at least a first specified period of time (e.g., 15 days, 30 days, 90 days, or other specified period) and no review has been posted;

the product is in a product category wherein less than a specified amount and/or specified percentage of products have received a first review (e.g., less the 70%, 50%, 25%, or other percentage);

the product detail page has been viewed a specified number of times (e.g., 1 time, 5 times, or other specified number of times), and no review has yet been posted;

the product is being offered by a relatively new seller that became a seller on the web site hosted by the system within a specified period of time (e.g., the last 30 days, 60 days, or other specified number of times);

the product price;

the profit that would be realized from a sale of the product.

Optionally, a minimum and/or maximum point restriction may be set and stored in memory for first product reviews generally and/or for specific first product reviews. Thus, for example, a maximum of 100 points may be set and/or a minimum of 0 points may be set. The foregoing point limitations ensure that a single first product review (e.g., on a book that is very likely to be highly popular) with a large number of helpful votes does not unduly weight the user's ranking. Similarly, if a user submits a negative review for a controversial book, it is likely that the user may receive many biased unhelpful votes. Providing a minimum point score ensures that a single unpopular review will not unduly lower the user's ranking.

Optionally, however, if a user violates certain review rules (e.g., by submitting large number of duplicate supposed reviews that are not substantive, such as "good product"; by submitting reviews within a very short period of time (e.g., 30 seconds) after an item is posted, indicating that the user is trolling for first review opportunities; by submitting offensive reviews, etc.) the review may be removed and the user may be given the standard minimum per review that is in violation of the review rules, less than the standard minimum per review (e.g., −20 points), or the user may be prohibited from submitting additional reviews generally or first reviews specifically. Optionally, a review may be removed, associated points cancelled, and/or negative points awarded if the community votes or requests that review be removed.

Further, if it is determined that a user is participating in a voting circle (e.g., where a group of people automatically submit helpful votes for each other's review rather than on the basis of the quality of the reviews) the user can be similarly penalized as discussed above and/or the user's helpful votes are removed and not counted towards the corresponding review score. Similarly, if a user (e.g., a parent) always submits helpful votes for another user (e.g., a child), optionally the user's helpful votes are removed and not counted towards the corresponding review score. Other types of biased voting (e.g., voting by a reviewer enemy or friend) or non-credible voting (e.g., voting on review after review in very quick succession, wherein it is unlikely that the vote has had time to actually read the reviews) can be detecting and discounted as desired. Thus, different types of biased votes can be processed differently and the penalties for biased votes are optionally increased as the votes appear to be more fraudulent.

Optionally, a search service is provided via which a user can search for products that have not yet been reviewed. Optionally, the search may be limited by the user to specific product areas (e.g., books, text books, music, movies, magazines, newspapers, kitchen, home, outdoors, clothing, shows, jewelry, watches, accessories, toys, electronics, computers, office products, software, cameras, audio, video, cell phone, cell phone service, musical instruments, video games, food, pet supplies, beauty, healthcare, furniture, home improvement, exercise, automotive, industrial, scientific, lawn & garden equipment, tools, hardware, etc.) and/or to products that the system has a record of the user purchasing or licensing.

FIGS. 2-9 illustrate example user interfaces. As will be recognized, the particular features of the illustrated user interfaces are merely illustrative, and many other possible embodiments may be used as well. For example, elements from different user interfaces can be combined into the same user interface, elements from a given user interface can be divided up among multiple user interfaces, and users interfaces can include additional or fewer elements than those illustrated. Further, the language provided in the user interfaces is merely illustrative and optional, and other language and terminology may be used. The user interfaces are optionally provided as Web pages.

Figures 2, 3A:
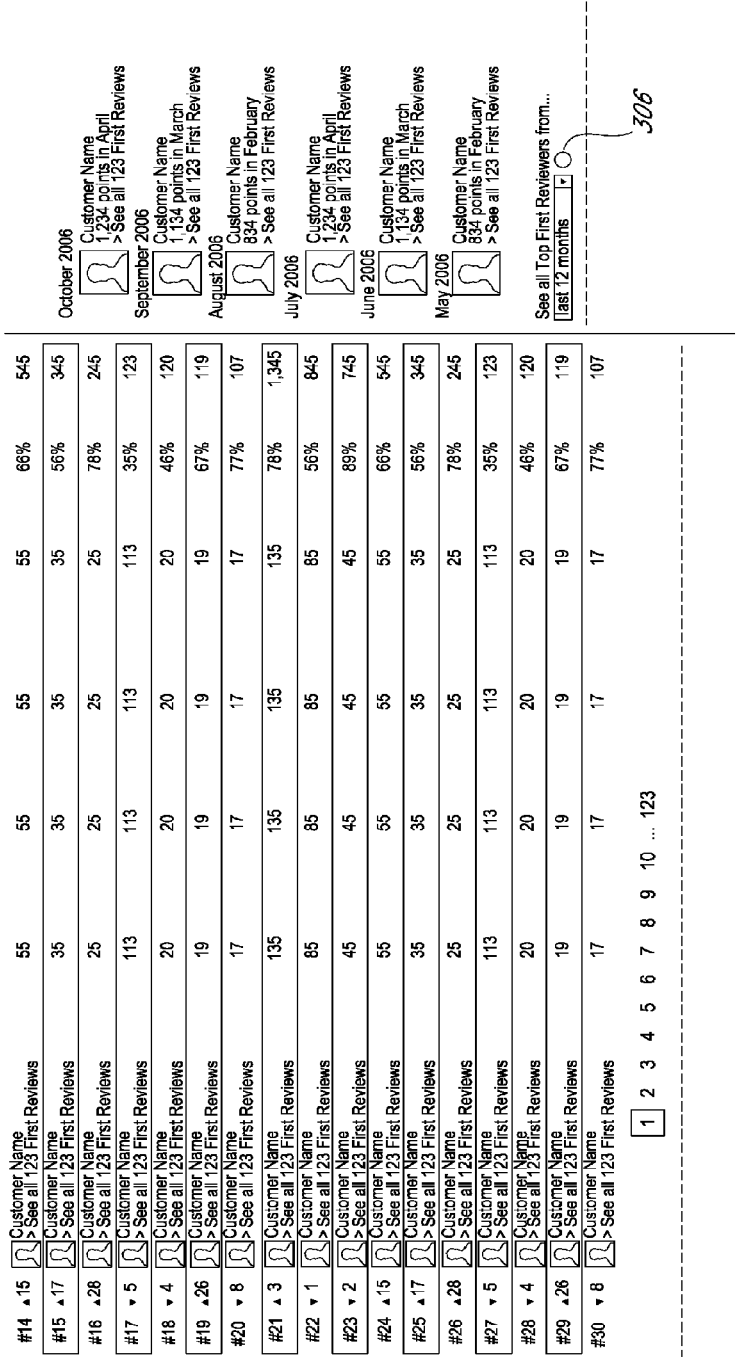

FIG. 2 (including FIGS. 2A1-A2) illustrates a user interface, which can act as a first review game landing page, providing information regarding users that have provided first product reviews. Links or menus are provided via which the user can access other user interfaces described herein.

Referring to FIG. 2, interface 202 provides a listing of monthly top first reviewers for a number of months (three in the illustrated example). One or more controls (e.g., a links) 204 are provided, which when activated, cause the user interface to display a listing of additional or all top first reviewers for a given month (or other specified time period).

A helpful first reviews interface 206 displays one or more first product reviews that have received the highest or among the highest helpful scores (e.g., wherein a helpful score equals or corresponds to the number of helpful votes from others minus the number of unhelpful votes). The first product reviews are displayed in association with a product title, a star review (where the greater the number of stars, the more favorable the user is rating the product), a review title, a review date, the name (actual or pseudo name) of the first reviewer, the number of points earned by the review, the number of helpful votes, the number of unhelpful votes, the difference between the number of helpful and unhelpful votes, and the number of first product review points assigned to the reviewer. The textual review is also provided. Optionally, a photograph or avatar/icon representing the reviewer and/or the product is presented. A control 208 is provided, which when activated, causes the user interface to display a listing of additional or all top first reviews.

A badge interface 210 is provided which lists the available badges (e.g., gold, silver, bronze, top first reviewer (lifetime)), and the number of users that have earned the badges.

Figures 3, 5A:
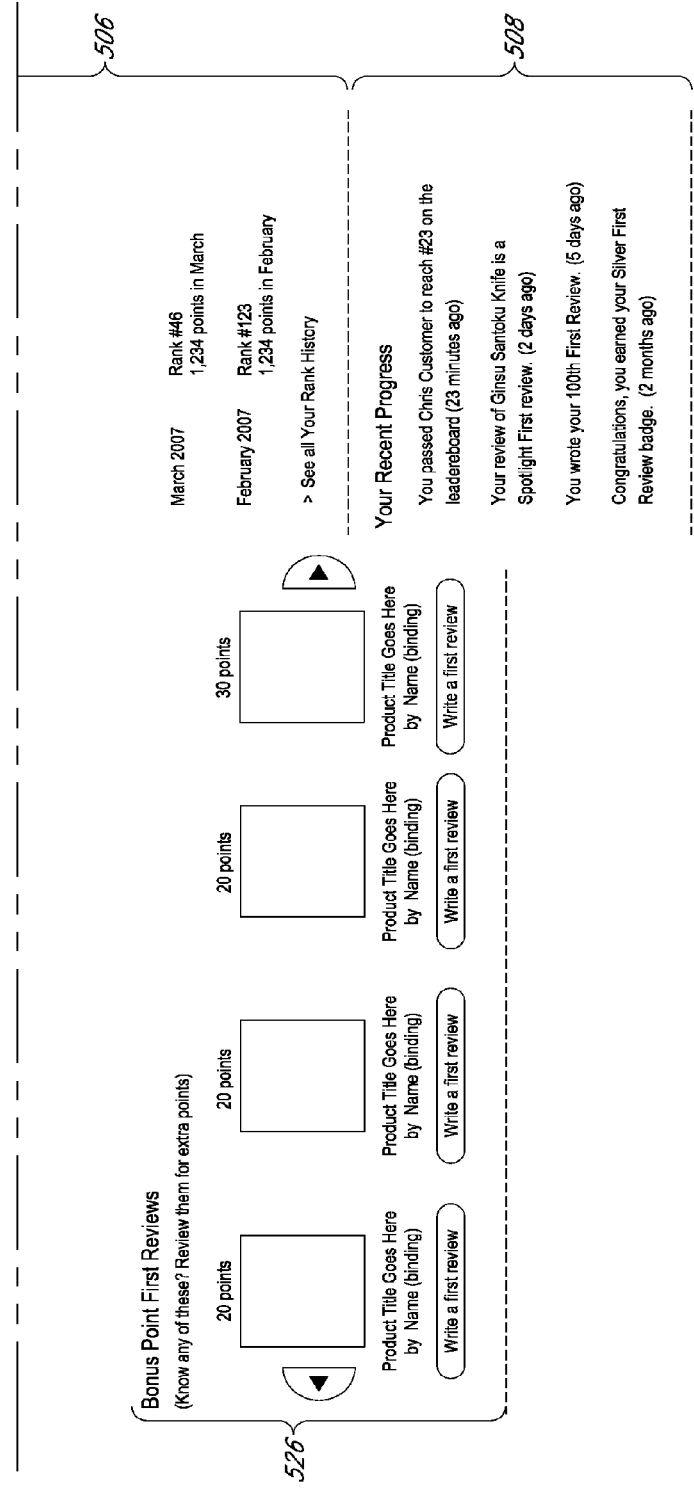

Interface 212 lists, via a leaderboard, the users that have the most first review points earned is a specified period of time (e.g., within the last 30, 60, or 90 days). In this example, the top 10 users are listed, although fewer, additional, or all users that have provided first product reviews within the specified time period (or other time period) can be listed. In this example, a given entry includes the user's rank, a symbolic indication (e.g., an upwards or downwards pointing arrow or triangle) indicating whether the user's rank has improved or gotten worse as compared to a previous ranking, a photograph or icon corresponding to the user, the user name (real or pseudo name), the current number of first review points, the number of first reviews submitted within the specified period of time, and the percentage of helpful votes relative to the sum of (helpful—not helpful votes) received for the user's first product reviews within the specified period of time. A control is provided that when activated causes an expanded version of the leaderboard to be presented, as illustrated in FIG. 3 (including FIGS. 3A1-A2).

Interface 214 provides information regarding how to play the game, how points and badges are awarded, how certain titles are awarded, and a notification regarding the possibility of rule changes.

A forum interface 216 is provided via which a user can access, read and submit posts in forums related to the game/contest. For example, users can discuss matters that they are happy or unhappy with, provide information, ask advice, give advice, discuss accomplishments (negative or positive), or chat. The forum may include sub-forums dedicated to certain topics.

Interface 218 displays the user's name, current number of points received within a specified period of time (e.g., the current month), the user's current ranking, and an explanation regarding how many points are needed to receive certain corresponding badges, and regarding the badge currently awarded to the user (e.g., the gold badge in this example as indicated by the visual emphasis). Thus, the user can visit this Web page to check on their progress in terms of points, ranking and/or title. A control is provided which the user can activate to log-in to another account.

Interface 220 displays information regarding potential first review candidates and the number of points that would be earned by submitting a first review, wherein the candidates are products that the system has determined from the user account database that the user has purchased. The candidates may be presented via a scrollable list (including a product name and/or photograph), and when the user sees a product that the user is interested in review, the user can activate a "write a first review" link. A user interface (not shown), including a text entry field is displayed via which the user can enter a textual review, and a star selection user interface is optionally provided via which the user can assign an appropriate number of stars corresponding with the item quality.

Several other different interfaces are provided via which a user can identify and select a product to provide a first review for. The user interfaces may be used to select a specific product, browse a product category, or search for a product that has not yet been reviewed. Interface 222 displays several first review candidates of particular products or categories of products via which the user can browse and select a product to provide a first review for. The categories can be selected to be or to include those categories in which the user has made a product purchase.

Interface 224 includes search fields via which the user can search for products that are in need of a first review. A drop down menu may be used to select one or more product categories within which the search is to be conducted. A search text field is provided via which the user can enter one or more search terms, optionally using Boolean equations. The user can activate a search control or provide an enter command and, in response, the system will conduct a search in accordance with the user's selection and search terms and return corresponding search results for display to the user.

Interface 226 displays a scrollable list of first review candidates for which bonus points may be earned. The candidates optionally may be limited to or include products purchased by the user via the system. Optionally, products purchased as gift by the user for another (e.g., as indicated by a corresponding database record that indicates that the user has indicated (explicitly and/or by instructing that the product be gift wrapped) are excluded from the first review candidates provided via interface 226.

FIG. 3 illustrates an expanded view of the leaderboard 212 illustrated in FIG. 2, including an extended list 302 of first reviewers, including the following information for a given customer: rank, the rank in a previous period, name, the number of first reviews submitted in a period of time (e.g., the last 90 days), the number of review points (e.g., the points received for submitting reviews), the number of helpful votes, the number of unhelpful votes, the helpfulness percentage (e.g., 100 (helpful votes/(helpful+unhelpful votes)), and the number of current points (e.g., the score based the user's review points, the number of helpful votes, and the number of unhelpful votes). An extended display 304 of monthly top reviewers is also provided in this example. A selection menu 306 is provided via which the user can specify the time period from which to display monthly top reviewers (e.g., the last week, the last month, the last 6 months, the last 12 months, of all time, etc.). The types of information provided via the user interface illustrated in FIG. 3 are substantially the same as that provided in the leaderboard 212 and the monthly top reviewers interface 202 illustrated in FIG. 2, although in other embodiments, less, more, or additional information may be provided.

Figure 4A-2:
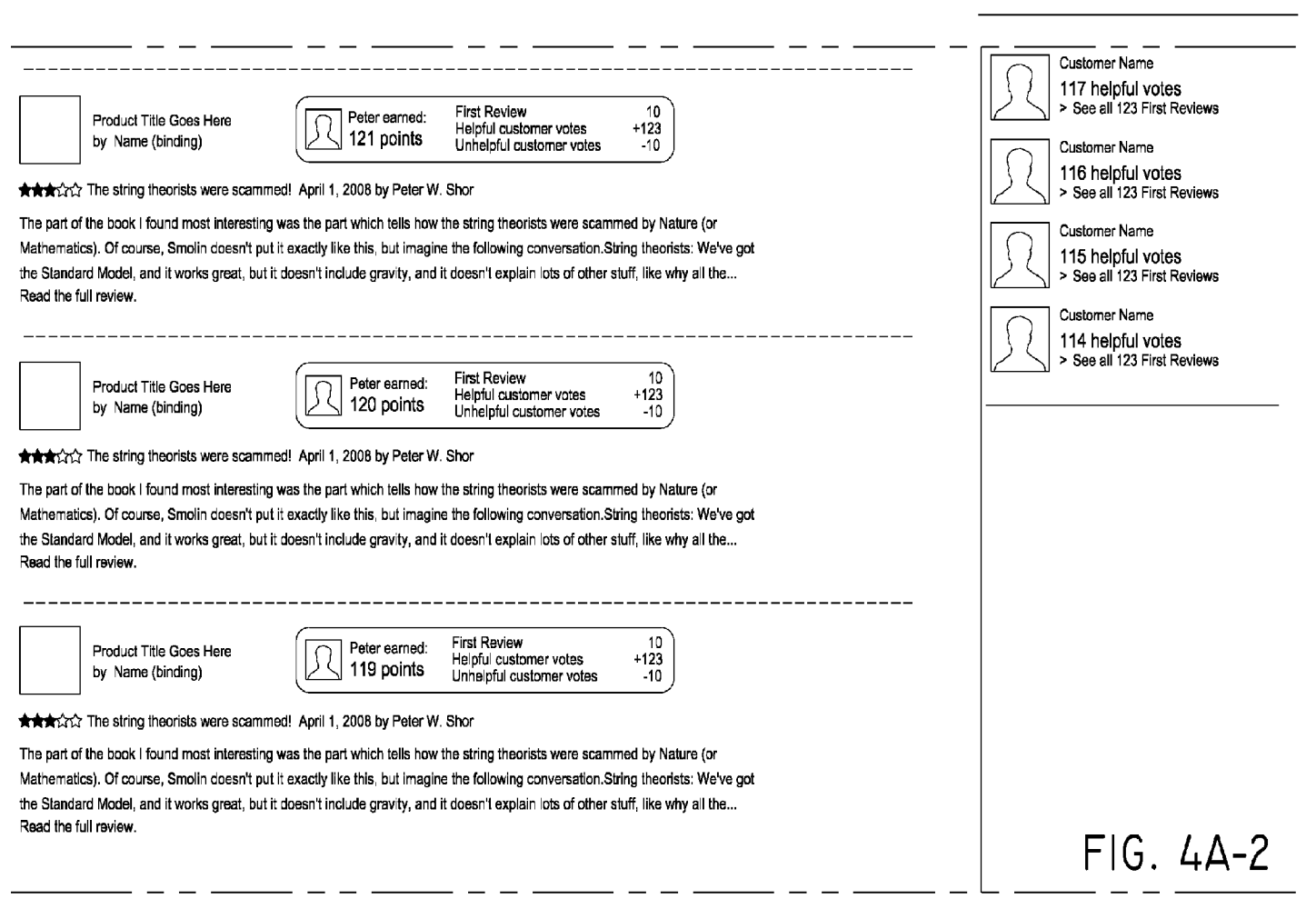

FIG. 4 (including FIGS. 4A1-A3) illustrates an expanded view of the most helpful first reviews interface 206 illustrated in FIG. 2, including an extended list of helpful first reviews. An extended display of monthly top reviewers is also provided. The types of information provided in this view are substantially the same as that provided in the leaderboard 212 and monthly top reviewers interface 202 illustrated in FIG. 2, although in other embodiments, less, more, or additional information may be provide.

FIG. 5 (including FIGS. 5A1-A3) provides an expanded view of the user interface 228 illustrated in FIG. 2. The illustrated user interface includes interfaces 518, 520, 522, 524, 526 corresponding to interfaces 218, 220, 222, 224, 226 illustrated in FIG. 2. In addition, user interface 502 provides a listing of first reviews submitted by the user. A listing entry in this example includes a product name and/or photograph, the number of points initially assigned for submitting the first review (e.g., 10 points, or if a bonus has been awarded, 20 points), the number of helpful votes received for the first review, the number of unhelpful points received for the first review, and the total score for the first review (e.g., Total points=first review points+number of helpful votes−number of unhelpful votes). The totals for each review (optionally including the displayed and undisplayed totals for a given time period or without a time limitation) are summed and displayed. Optionally, the first review points list 502 can be expanded to display the review points entries for all the user's reviews (optionally limited to a time period, such as the previous 3 months or the time period that the user's current ranking is based upon).

A "leaderboard position" user interface 504 is displayed which shows the user's ranking and the users whose rankings are within a specified range above and below the user (e.g., based on users that earned review points in a specified period of time such as the last 90 days). In this example, the user interface 504 shows the two users (having rankings of 21 and 22) ranked immediately above the user accessing the interface (having a rank of 23) and the two users ranked immediately below the user (having rankings of 24 and 25). A review user entry in this example includes the user name, user ranking, a photographic or icon representing the user, the number of recent points (e.g., earned in the last 90 days or other time period), and the number of lifetime reviews. A control is provided that when activated causes an expanded list of active first reviewers to be displayed.

A rank history user interface 506 includes a graphical display (e.g., an area, bar, and/or line graph) of the user's rank over a period of time (e.g., the time period on which the current rank is based, over the last 90 days, over the lifetime of the user's rankings, etc.), and provides a numerical rank for a certain number of recent months and the points earned during those months. A control is provided that when activated causes an expanded list of the rank history to be displayed (e.g., showing each month over the lifetime of the user's rank history).

A recent progress user interface 508 provides information on the user's recent progress relative to others and in absolute terms. For example, the recent progress user interface 508 may report some or all of the following (or other types of information):

- a change in the user's ranking;
- when the user's ranking has changed by a certain amount (e.g., an increase or decrease of at least 5 rankings);
- when the user's ranking has reached a specified ranking level;
- when the user has reached or surpassed a certain number of points;
- when the user has dropped below a specified number of points;
- when the user has dropped a certain number of points;
- when the user has submitted certain number(s) of first reviews;
- a change in the user's title/badge;
- when the user has been surpassed in ranking by another specified user or users;
- when the user has received a certain number and/or percentage of helpful votes for the user's first reviews;
- when a review score for a user review falls to a certain level (e.g., 0 points);
- a determination that an item purchased by the user does not have any reviews on the item web page;
- that a product purchased by the user is eligible for first review bonus points.

Referring to interface 508, in this example the user is notified of certain other users the user passed in ranking and the associated time of the passing in ranking. The interface 508 also identifies a first review submitted by the user that is being provided with special treatment. In this example, the user is notified that the identified user's review is being highlighted to other users (e.g., via the most helpful review user interface 206, referred to as a "Spotlight First Review")). In addition, the user is notified that the user was awarded a certain level of badge (e.g., a silver badge), and in congratulated on having submitted a notable number of first reviews (e.g., 100 reviews).

Figures 2, 6A:
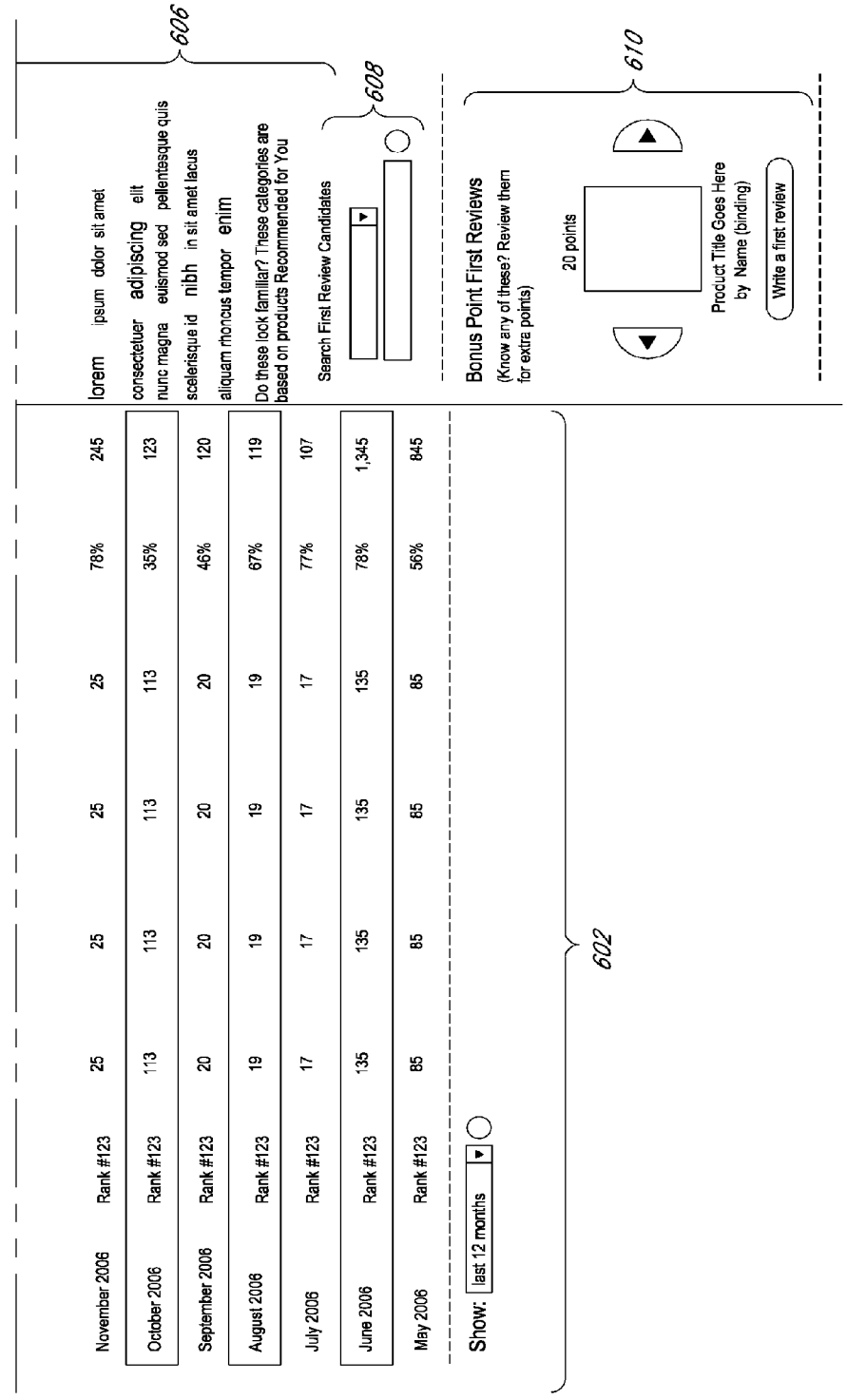

FIG. 6 (including FIGS. 6A1-A2) illustrates an expanded view 602 of interface 506, including an expanded graphical representation of the of user's rank over a period of time and including numerical representations of the user's performance on a monthly (or other time period) basis. The numerical information can include the user's rank during a specified time period (e.g., the rank achieved at the end of the time period), the number of first reviews submitted in the period of time (e.g., that month), the number of review points, the number of helpful votes, the number of unhelpful votes, the helpfulness percentage. FIG. 6 further includes interfaces 604, 606, 608, and 610 similar to interfaces 220, 222, 224 and 226 illustrated in FIG. 2.

Figures 2, 7A:
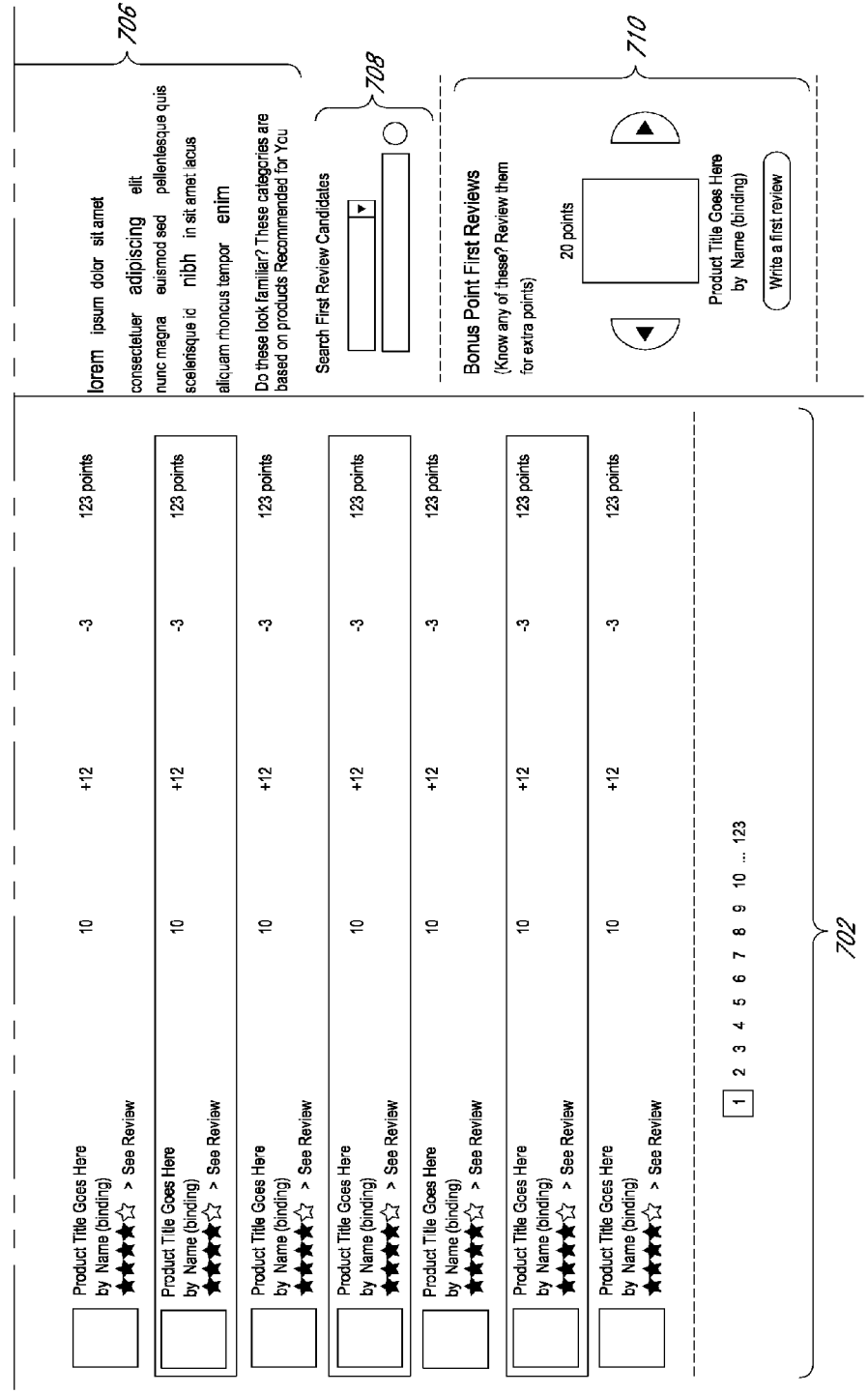

FIG. 7 (including FIGS. 7A1-A2) illustrates an expanded view 702 of interface 502, and further includes interfaces 704, 706, 708, and 710 similar to interfaces 220, 222, 224 and 226 illustrated in FIG. 2.

Figure 8:
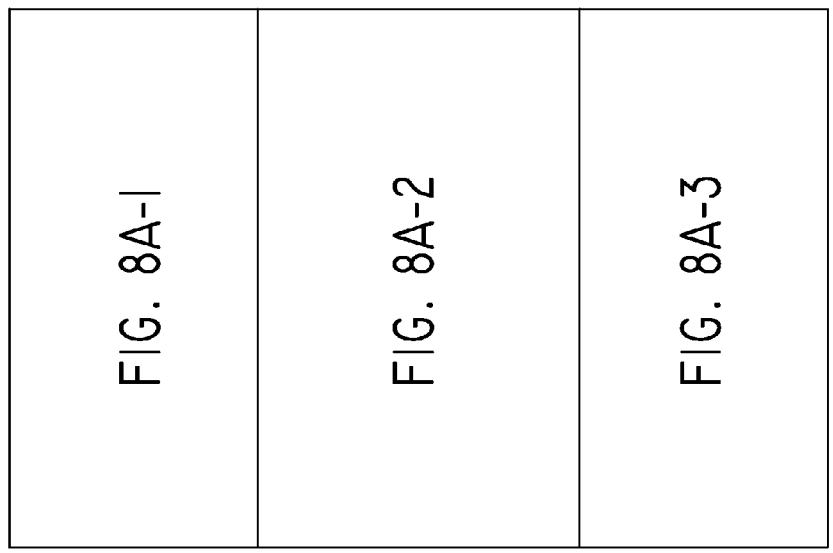
Figures 3, 8A:
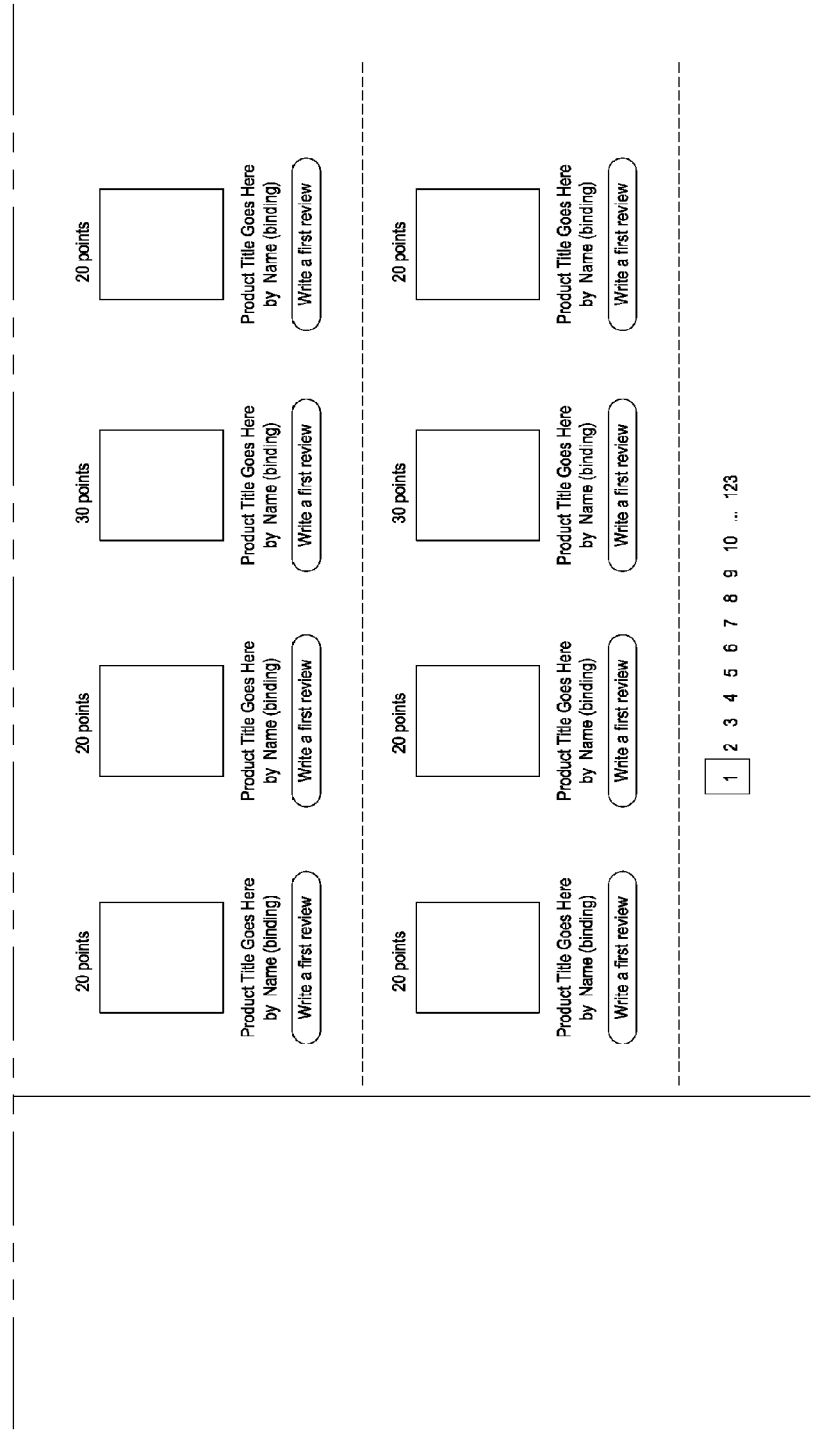

FIG. 8 (including FIGS. 8A1-A3) illustrates an expanded view 802 of first review candidates interface 220 (listing a plurality of first review candidates with associated points for submitting a first review), as well as interfaces 804, 806 similar to interfaces 222 and 226. FIG. 9 (including FIGS. 9A1-A3) illustrates an expanded view 902 of the first reviews discussions/forums interface 228, wherein an entry listing includes a subject line, a number of posts, and when the last post was posted. Interfaces 904, 906 corresponding to interfaces 202, 206 are also provided.

FIG. 1 illustrates an example web site system that implements services described herein, and illustrates the flow of information between components of the system. As illustrated in FIG. 1, web servers 90 retrieve catalog content for particular products from a catalog service 94, which includes or accesses a data store, such as repository 96, of item content. The item content may, for example, include photos, reviews, price and availability data, and other types of descriptive information about particular products that are available to purchase, rent, download, review, post for sale, etc. via the web site.

The web servers 90 further communicate with a first review game system 110. The first review game system 110 further communicates with the item content database 96 and a user data database 108. The first review game system 110 provides services related to the first review game described above. For example, the first review game system 110 accesses the item content database 96 to identify items and categories of items lacking in reviews (e.g., those categories that have more than an average number of items without first reviews, or that have above a certain percentage of items (e.g., more the 50%, 60%, 70%, 80% or 90%), including items that do not have first reviews. In addition, the first review game system 110 determines when bonus points are to be offered for a first review.

The first review game system 110 accesses the user database 108 to identify users playing the first review game, determine which products they have purchased and to recommend first review candidates using such information. Optionally, the search engine 101 discussed below can be used to determine which products users have purchased and recommend first review candidates using such information and/or other information available to the search engine service 101 to determine potential affinities.

The first review game system 110 further accesses the number of first points a user has overall, on a monthly (and/or other time period) basis, and how many points the user has received for a given first review. Based on the user points and a specified ranking period (e.g., the previous 90 days), the service 110 determines rankings, assigns badges, identifies most helpful reviews, and provides other related services described herein.

The web servers 90 also optionally communicate with a tagging service 98 that maintains a database 100 of user-specific tag data. The tag data stored for each user may, for example, include a set of tag-item ID pairs, optionally together with various other types of data such as permission data and a creation timestamp. The tagging service 98 may receive both read requests from the web servers (e.g., when a user requests a page that displays personal tag data), and update requests (e.g., when a user tags an item). In an example embodiment, each tag is stored in association with the corresponding user, meaning that if two or more users create identical tags, these tags are treated as separate and distinct from each other.

The web servers 90 also communicate with the search engine 101 that allows users to search for information stored in the item content, such as products that do not have any associated user/customer reviews, and tag data repositories 96 and 100. As mentioned above, the search engine 101 may include functionality (including a keyword index) for users to search for items using their own respective tag associations, and/or the tag associations of others. A user interface for the search engine 101 is described above with reference to FIG. 2.

The web servers 90 also access a recommendations service 102 which generates item recommendations as described above. To request recommendations for a particular user, the web servers 90 send a list of one or more items (e.g., product IDs) to the recommendations service 102 (optionally together with associated item ratings), which responds with a list (e.g., of recommended items and/or first review candidates).

In the illustrated embodiment, the recommendations service 102 accesses a Similar Items Table 104 which contains item-to-item mappings used to generate the recommendations. The item-to-item mappings represented in this table 104 may reflect purchase-based similarities (e.g., items A and B are similar because a relatively large portion of the users who purchased item A also bought item B), item viewing based similarities (e.g., items A and B are related because a significant portion of those who viewed item A also viewed item B), tag-based similarities (e.g., items A and B are similar because a relatively large portion of the users who tagged item A assigned the same tag to item B), content-based similarities, review-based similarities, and/or similarities based on other criteria.

As similarly discussed above, the recommendations service 102 can utilize reviews submitted by a user in order to generate product recommendations. For example, if a user provided a review on an item, other similar products or products purchased or viewed by other users that purchased or viewed the reviewed product may be recommended to the user. Products that the user provided first reviews on may optionally be weighted more heavily in determining an affinity and providing recommendations then products where the user provided a review but did not provide the first review. Further, the content of the review provided by the user (e.g., the point rating and/or a text rating parsed by the system) may be used in determining what products to recommend.

Optionally, if the user has in the past indicated a willingness to provide first reviews (e.g., as determined by examining the number of first reviews submitted by the user within a certain time period and/or over the lifetime of the user's account), the service may increase the prominence of un-reviewed products that the service determines the user may otherwise have an affinity for in the recommendations provided to the user. The prominence can be provided by listing un-reviewed products first, by using a color emphasis/highlighting, by providing a text or symbol indicating that the product have not yet been reviewed, or otherwise.

The Similar Items Table 104 is generated or updated offline by the Item-Association Mining Application 106, which may use the same or similar data analysis methods to those described in U.S. Pat. No. 6,912,505, referenced above. In one embodiment, a similar items list generated by the Item-Association Mining Application 106 and stored in the Similar Items Table 104 consists of the N (e.g., 20) items which, based on correlations between items, are deemed to be the most closely related to the item for which associations are sought. An item in the Similar Items Table 104 is stored together with a commonality index ("CI") value which indicates the relatedness of that item to the item for which associations are sought. Other recommendation engines or services capable of generating a set of recommended items given an input set of items may be used as well.

The web servers 90 also access one or more additional repositories of user data, logically represented in FIG. 1 by the repository 108. Because a group of individuals can share an account, a given "user" may include multiple individuals (e.g., two family members that share a computer). As illustrated by FIG. 1, the data stored for each user may include one or more of the following types of information (among other things) that can be used to generate recommendations: (a) the user's purchase history, including dates of purchase, (b) a history of items recently viewed by the user, (c) the user's item review/ratings profile, if any, (d) the user's first reviews, first review scores, helpful/not helpful review votes, ranking and badges/titles, and (e) the current contents of the user's personal shopping cart. Various other types of user information, such as wish list/registry contents, email addresses, shipping addresses, and clickstream histories, may additionally be stored.

The various components of the web site system 86 may run, for example, on one or more servers (not shown). In one embodiment, the Similar Items Table 104 is be stored as a B-tree data structure to permit efficient look-up, and may be replicated across multiple machines to accommodate heavy loads. As will be appreciated, the systems and processes may also be implemented using a recommendations algorithm that does not make use of a similar items table or other item-to-item similarity mappings.

Figure 10:
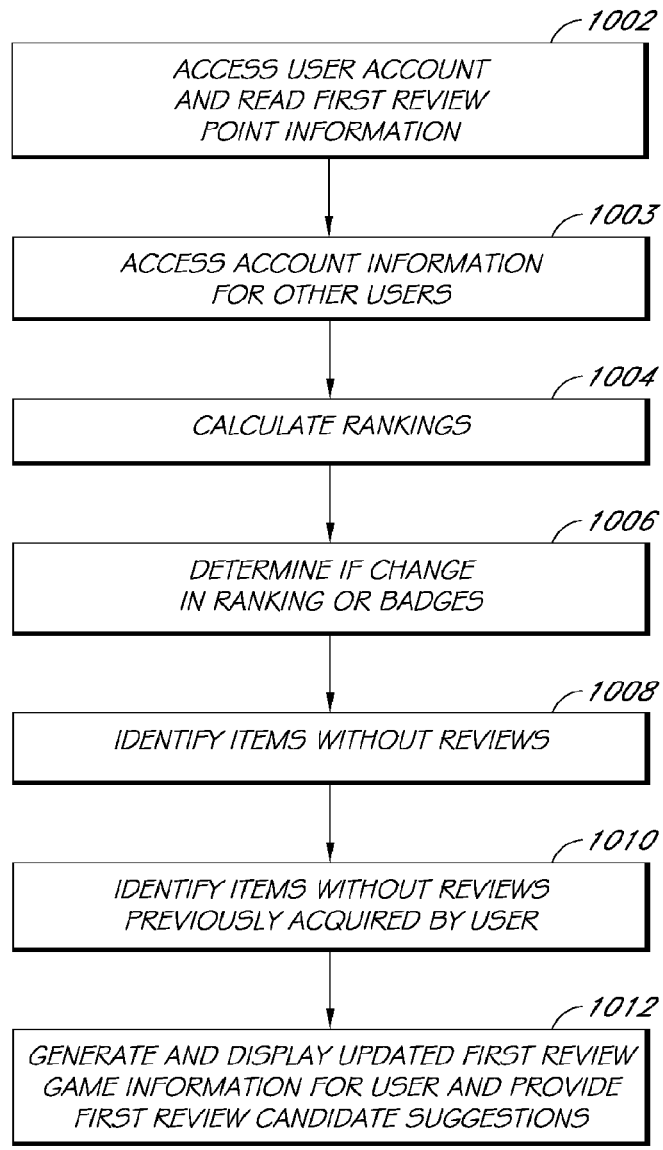
FIG. 10 illustrates an example process performed by the system illustrated in FIG. 1.

Referring to FIG. 10, an example first review incentive process that can be executed via the system illustrated in FIG. 1 will now be described. Other embodiments can perform the process with fewer or additional states, or the states may be performed in a different order.

The process may be invoked in real-time in response to an online action of the user or may be continuously running. For example, the user may specifically access a first review landing page, such as that illustrated in FIG. 2, which causes the process to update the information to be displayed on the landing page. In addition or instead, the process may be invoked in response to an online action of the user that does not directly relate to playing the first review game. For example, the process may be invoked in response to a user having purchased an item that does not have a review and inferring or estimating that the user has had time to use the item.

Any of a variety of other methods can be used to initiate the first review incentive process and to display or otherwise convey the information discussed above with respect to the example user interfaces. For example, the information can automatically be generated periodically and sent to the user by e-mail, in which case the e-mail listing may contain hyperlinks to the user interfaces or to products needing reviews. Further, the information can be generated in advance of any request or action by the user, and cached until requested.

At state 1002, a user action is detected initiating the process. The user's account is accessed (e.g., from user data database 108), and the user's current first review points, current ranking, current title/badge, and the number of the user's helpful/not helpful first review votes are read. At state 1003, the current scores and rankings of other users are accessed (e.g., from user data database 108). At state 1004, the current ranking of the user is calculated based on the user's first review score (e.g., which is calculated based on the number of first reviews within a specified time period, the number of helpful/unhelpful first review votes, the number of bonus points, and/or other criteria) and that of other users.

At state 1006, the system determines whether the user's ranking, and/or title/badge entitlement has changed and whether any new or recent notable first review-related events have occurred with respect to the user.

At state 1008, the item content repository 96 is accessed and products without reviews are identified. At state 1010, items that have previously been purchased by the user that do not have reviews and that an inference or indication that the user has used the item are identified. At state 1012, the process updates and displays first review game-related information to the user using the web servers 90. For example, the information can include some or all of the information discussed above with respect to the various user interfaces (e.g., the user's current ranking, the user's ranking trend, the user's current badge assignment, the user's position relative to user's having somewhat higher and lower rankings, the current most or more helpful reviews, first review candidates, etc.).

Optionally, the user can request additional information (e.g., by activating an appropriate control or menu selection), access an item page in order to provide a first item review, or take other action.

As discussed above, in addition to first reviews, the embodiments and electronic interactive games/contests described herein may be utilized with respect to encouraging other types of user behavior, such as encouraging the submission of reviews generally (and not just first reviews), the submission of tags, the submission of votes as to the quality or helpfulness/unhelpfulness of reviews, the submission of pictures of products, the submission of product catalogs, product manuals, the submission of recommendations as to similar alternate products, the submission of lists of related items the user finds interesting or recommends (e.g., a list of children books, a list of novels, a list of toys, a list of cooking equipment, etc.), the submission of updates to product information, the submission of recommendations of accessories, the submission of useful software programs or widgets, the submission of information or corrections to a wiki/collaborative website, participating in a forum, etc. Users can be rewarded for behaving in the desired manner with points, bonus points, rankings, titles, and/or badges as similarly discussed above.

In certain instances, users may be incentivized to provide information where a complete lack of such information has been identified (e.g., via a search engine or otherwise) with respect to the relevant data record/data store (e.g., in the item content data repository 96, the tag data repository 100, the user data repository 108, or other data repository). In certain instances, the system may incentivize users to provide information where a complete lack of such information has been identified with respect to the relevant data record/data store and/or where there is such information in the data store, but the amount, quantity, or quality of such information is insufficient or less than a desirable amount (e.g., as measure relative to a corresponding threshold setting stored in system memory, wherein, for example, the threshold can be a single submission of a given type information, three submissions, five submissions, or other specified number of submissions) or quality (e.g., as determined by the numbers and/or rations of helpful/unhelpful votes, accurate/inaccurate votes, etc.).

For example, with respect to a product manual, in certain situations a single submission of a manual for a given item may be sufficient. Thus, in an example embodiment, points are awarded for the first person to submit the manual and not for subsequent submissions. Optionally, bonus points can be awarded for providing product manuals for certain types of products (e.g., as similarly discussed above with respect to first reviews). Optionally, users may be able to vote on the legibility or illegibility of a submitted manual, and such votes can be used to modify the score. For example, a user can be assigned a first number of points (e.g., 40 points) for submitting the first manual for a product, an additional number of points (or fraction of a point) for each "legible and complete" vote received from other users regarding the legibility and completeness of the manual, and a negative number of points (or fraction of a point) for each "illegible or incomplete" vote received. The votes may be provided via an item Web page that displays the manual and voting buttons (e.g., legible, illegible, complete, incomplete, etc.). Rankings, titles, badges, and/or information can be provided as similarly described above with respect to first reviews. Optionally, a search engine may be used to locate items without product manuals. Optionally, a recommendation engine is provided that identifies a user's potential affinity for an item lacking a product manual and suggests that the user provide a product manual for the identified item. Optionally, the system identifies users that have purchased an item lacking a product manual and asks some or all of those users (via email, an SMS/MMS message, a Web page, or otherwise) to provide a product catalog (e.g., via an upload of a digital version of the manual, as an email attachment, via fax, mail, or otherwise).

By way of further example, with respect to an item tag, in certain situations a certain minimum number of tags may desirable. Thus, in an example embodiment, points are awarded for the first person to submit a tag for an item and for subsequent tag submissions for the item. Optionally, a user may be awarded a first number of points for the being the first user to submit a tag for an item, and subsequent users submitting tags for the item are awarded a second number of points (e.g., equal to the first number of points, or less than the first number of points). Optionally, bonus points can be awarded for providing tags for certain types of products (e.g., as similarly discussed above with respect to first reviews), and not for others. Optionally, users may be able to vote on the helpfulness or accuracy of a submitted tag, and such votes can be used to modify the score for a tag submission. For example, a user can be assigned a first number of points (e.g., 40 points) for submitting an item tag, an additional number of points (or fraction of a point) for each helpful or accurate vote received from other users regarding the helpfulness or accuracy of the tag, and a negative number of points (or fraction of a point) for each unhelpful or inaccurate vote received. The votes may be provided via an item Web page that displays the tags and voting buttons (e.g., helpful, unhelpful, accurate, inaccurate, etc.). Rankings, titles, badges, and/or information can be provided as similarly described above with respect to first reviews. Optionally, a search engine may be used to locate items that have less then a specified threshold of tags (e.g., wherein, for example, the threshold can be a single tag, two tags, five tags, or other specified number of tags). Optionally, a recommendation engine is provided that identifies a user's potential affinity for an item lacking sufficient tags and suggests that the user provide a tag for the identified item. Optionally, the system identifies users that have purchased an item lacking sufficient tags and asks some or all of those users (via email, an SMS/MMS message, a Web page, or otherwise) to provide a tag.

By way of still further example, with respect to recommendations as to similar alternate products, in certain situations a certain minimum number of such recommendations may desirable. Thus, in an example embodiment, points are awarded for the first person to submit a recommendation as to similar alternate products for an item, and for subsequent alternate product recommendations for the item. Optionally, a user may be awarded a first number of points for the being the first user to submit an alternate product recommendation for an item, and subsequent users submitting alternate product recommendations for the item are awarded a second number of points (e.g., equal to the first number of points, or less than the first number of points). Optionally, bonus points can be awarded for providing alternate product recommendations for certain types of products (e.g., as similarly discussed above with respect to first reviews). Optionally, users may be able to vote on the helpfulness of a submitted alternate product recommendation, and such votes can be used to modify the score for a alternate product recommendation submission. For example, a user can be assigned a first number of points (e.g., 40 points) for submitting an alternate product recommendation, an additional number of points (or fraction of a point) for each helpful vote received from other users regarding the helpfulness of the alternate product recommendation, and a negative number of points (or fraction of a point) for each unhelpful vote received. The votes may be provided via an item Web page that displays the alternate product recommendation and voting buttons (e.g., helpful, unhelpful, etc.). Rankings, titles, badges, and/or information can be provided as similarly described above with respect to first reviews. Optionally, a search engine may be used to locate items that have less then a specified threshold of alternate item recommendations. Optionally, a recommendation engine is provided that identifies a user's potential affinity for an item lacking sufficient alternate product recommendations and suggests that the user provide an alternate product recommendation for the identified item. Optionally, the system identifies users that have purchased an item lacking alternate product recommendations and asks some or all of those users (via email, an SMS/MMS message, a Web page, or otherwise) to provide an alternate product recommendation.

By way of yet further example, with respect to lists of related products, in certain situations a certain minimum number of lists for a given product area may desirable. Thus, in an example embodiment, points are awarded each list containing at least a specified number (e.g., 1, 2, 3, or other specified number) of items (e.g., related items). Optionally, bonus points can be awarded for providing product lists for certain types of products (e.g., as similarly discussed above with respect to first reviews). Optionally, users may be able to vote on the helpfulness/usefulness of a submitted list, and such votes can be used to modify the score for a alternate product recommendation submission. For example, a user can be assigned a first number of points for submitting a related product lists, an additional number of points (or fraction of a point) for each helpful vote received from other users regarding the helpfulness of the alternate product recommendation, and a negative number of points (or fraction of a point) for each unhelpful vote received. The votes may be provided via an item Web page that displays the alternate product recommendation and voting buttons (e.g., helpful, unhelpful, etc.). Optionally, the number of points awarded for a list submission can related to the number of items in the list (e.g., 10 points for each additional item after a minimum initial number of items). Rankings, titles, badges, and/or information can be provided as similarly described above with respect to first reviews. Optionally, a search engine may be used to locate product areas that have less then a specified threshold of item lists and/or having less than a certain percentage of items on a list. Optionally, a recommendation engine is provided that identifies a user's potential affinity for a product area lacking sufficient item lists and suggests that the user provide an item list for the identified product area. Optionally, the system identifies users that have purchased an item from a product area lacking sufficient items lists (e.g., relative to a specified threshold) and asks some or all of those users (via email, an SMS/MMS message, a Web page, or otherwise) to provide item lists.

Figure 12A-6:
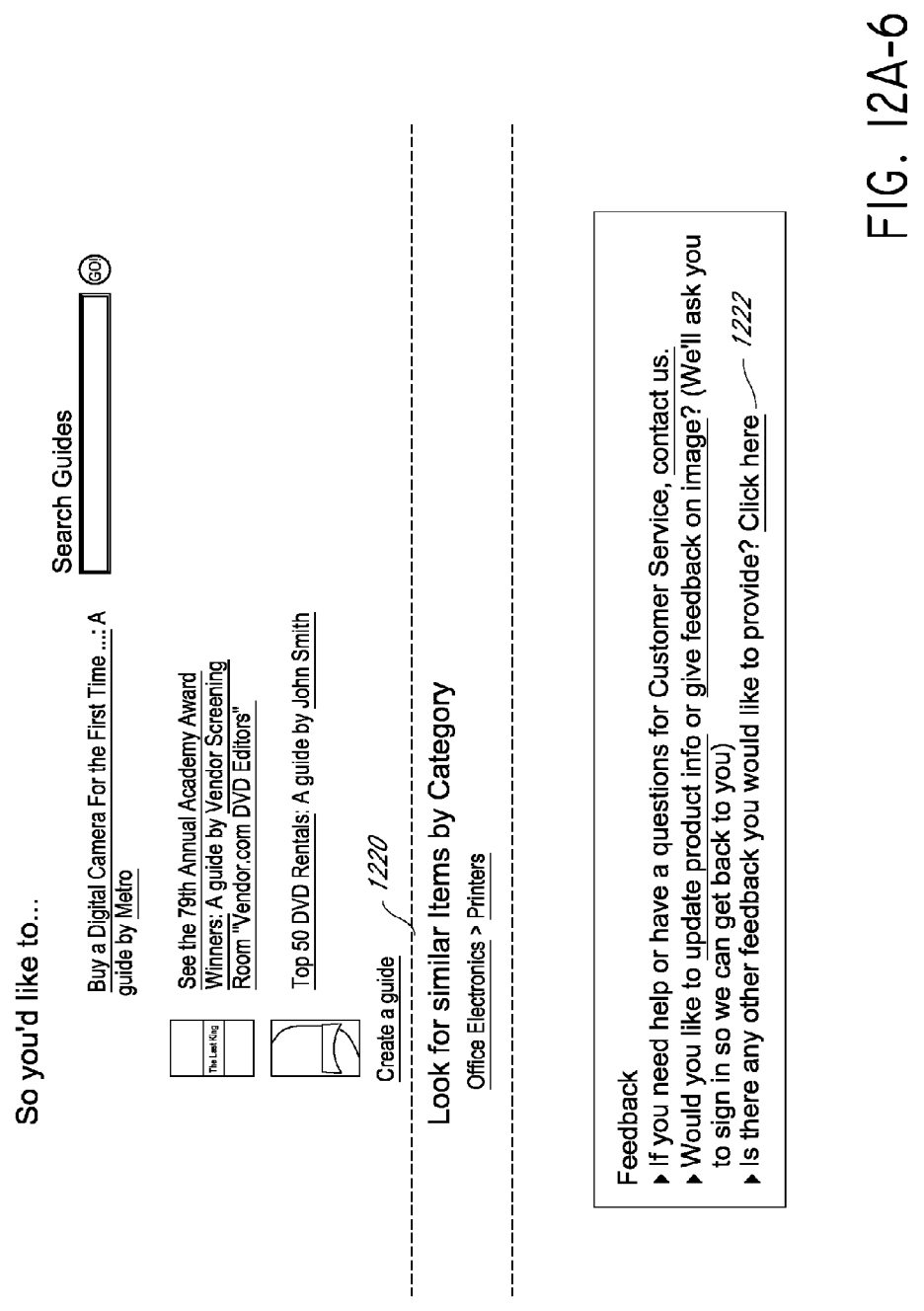

The item lists, alternate product recommendations, tags, reviews, catalogs, pictures, manuals, recommend accessories, guides, articles, other feedback, and/or other submissions are optionally displayed on, accessed from (e.g., via a hyperlink), or submitted via one or more corresponding relevant item detail pages. For example, the user interface illustrated in FIG. 12 (including FIGS. 12A1-6) provides links or fields for submitting pictures 1202, updates for product information 1204, feedback on images 1206, tag submissions 1208, user reviews/ratings 1210, 1212, discussion content (e.g., questions, opinions, information, etc.) for an online discussion forum, submission of item-related or other articles 1216, submission of item lists 1218, guides 1220 (for using an item, selecting an item, providing recommendations on a grouping of items, proving information on a grouping of related items, performing a process, etc.), or providing other feedback 1222.

Figure 11:
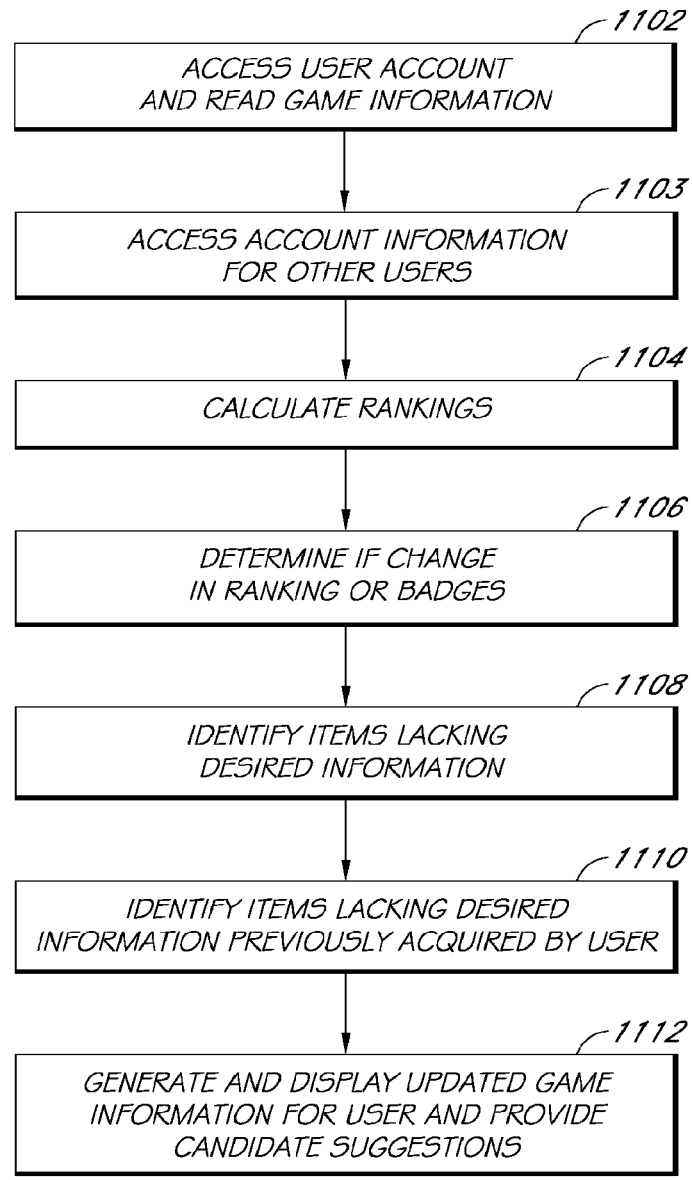
FIG. 11 illustrates another example process performed by the system illustrated in FIG. 1.

Referring to FIG. 11, an example process for incentivizing users to submit information or to take a desired action via an interactive game that can be executed via the system illustrated in FIG. 1 will now be described. Other embodiments can perform the process with fewer or additional states, or the states may be performed in a different order.

As similarly discussed above with respect to FIG. 10, the process may be invoked in real-time in response to an online action of the user or may be continuously running. For example, the user may specifically access one or more game user interfaces. In addition or instead, the process may be invoked in response to an online action of the user that does not directly relate to accessing a game user interface. For example, the process may be invoked in response to a user having purchased an item whose catalog listing is missing or has an insufficient amount of certain types of information (e.g., a manual, sufficient numbers of tags, photographs, alternate item suggestions, helpful/unhelpful review votes, etc.).

Any of a variety of other methods can be used to initiate the illustrated process and to display or otherwise convey the information discussed above with respect to the example user interfaces. For example, the information can automatically be generated periodically and sent to the user by e-mail, in which case the e-mail listing may contain hyperlinks to the user interfaces or to products needing the identified information. Further, the information can be generated in advance of any request or action by the user, and cached until requested.

Referring again to FIG. 11, at state 1102, a user action is detected by the system, initiating the process. The user's account is accessed (e.g., from user data database 108), and the user's current game points, current ranking, current title/badge, and other information related to the user's score (e.g., the number of the user's helpful/not helpful votes for reviews, tags, photographs, accuracy votes, legibility votes, etc.; the number of legible/illegible votes for manuals, etc.) are read. At state 1103, the current scores and rankings of other users are accessed (e.g., from user data database 108). At state 1104, the current ranking of the user is calculated based on the user's current game score (e.g., which is calculated based on the number of the user's submissions within a specified time period, the number of votes from other users related to the submission, the number of bonus points, and/or other criteria) and that of other users.

At state 1106, the system determines whether the user's ranking, and/or title/badge entitlement has changed and whether any new or recent notable game-related events have occurred with respect to the user.

At state 1108, the item content repository 96 is accessed and products lacking the desired information are identified. At state 1110, items that have previously been purchased by the user lacking the desired information are identified. At state 1112, the process updates and displays game-related information to the user using the web servers 90. For example, the information can include some or all of the information discussed above with respect to the various user interfaces (e.g., the user's current ranking, the user's ranking trend, the user's current badge assignment, the user's position relative to user's having somewhat higher and lower rankings, candidates that need information submissions, etc.). The system optionally searches for and identifies candidates that need certain types of submissions (e.g., Reviews, tags, identification of similar or alternate products, item lists, pictures, product catalogs, product manuals, guides, articles, online discussion participation, updated product information, and/or accessory recommendations, etc.).

Thus, as described herein, certain example embodiments search for and identify items in an interactive electronic catalogue that do not have an associated item review or other types of desired information. Such items are identified selectively to users and such users are prompted or otherwise encouraged to submit a first review or other desired information. Certain example embodiments utilize a game format, where players are assigned points for submitting first reviews or other desired information and optionally further assignment points if other users find the first review or other desired information helpful, accurate, and/or legible.

Although certain example embodiments are described herein, other embodiments that are apparent to those of ordinary skill in the art, including embodiments which do not provide all of the benefits and features set forth herein, may also be utilized.

What is claimed is:

1. A computing system configured to identify data repository deficits, comprising:
   a computing device;
   an interactive catalog of items being offered to users for purchase;
   a data repository that stores:
      purchase histories for users; and
      a first type of information related to catalog items submitted by users and an identification as to which user submitted a given information of the first type;
   a system configured to identify catalog items that do not have an amount of the first type of information that meets a first threshold;
   a recommendation system configured to recommend to a user candidate items, identified as not having the amount of the first type of information that meets the first threshold, for the user to provide the first type of information for,
   wherein the recommendation system uses data stored in the data repository to determine user item affinity based at least in part on a similarity of at least one item, for which the user previously provided information of the first type, with at least one of the identified catalog items that do not have a sufficient amount of the first type of information that meets the first threshold; and
   wherein the computing system is configured to selectively provide, at least partly in response to a recommendation from the recommendation system recommending candidate items that do not have a sufficient amount of the first type of information that meets the first threshold, for display on a user system:
      a user interface that provides functionality for the user to select an item from the recommended candidate items that do not have a sufficient amount of the first type of information that meets the first threshold; and
      a user interface via which the user can provide the first type of information for an item selected by the user from the recommended candidate items that do not have a sufficient amount of the first type of information that meets the first threshold.

2. The computing system as defined in claim 1, wherein the identification of catalog items that do not have a sufficient amount of the first type of information further comprises identifying catalog items that do not have an amount of information that meets the first threshold regarding at least one of: accessories for respective catalog items, substitute identification items for respective catalog items, manuals for respective catalog items, or item photographs for respective catalog items.

3. The computing system as defined in claim 1, wherein the identification of catalog items that do not have a sufficient amount of the first type of information further comprises identifying catalog items that do not have an amount of user provided descriptive tags that meets the first threshold.

4. The computing system as defined in claim 1, wherein the identification of catalog items that do not have a sufficient amount of the first type of information further comprises identifying catalog items that do not have an amount of indications of usefulness with respect to user submissions that meets the first threshold.

5. The computing system as defined in claim 1, wherein the identification of catalog items that do not have a sufficient amount of the first type of information further comprises identifying catalog items that do not have an amount of indications of accuracy with respect to user submissions that meets the first threshold.

6. The computing system as defined in claim 1, wherein the identification of catalog items that do not have a sufficient amount of the first type of information further comprises identifying catalog items that do not have an amount of online discussion content that meets the first threshold.

7. The computing system as defined in claim 1, wherein the identification of catalog items that do not have a sufficient amount of the first type of information further comprises identifying catalog items that do not have an amount of lists of related items that meets the first threshold.

8. The computing system as defined in claim 1, further comprising a search engine system configured to provide functionality for users to conduct searches to locate items in the interactive catalog that do not have the amount of the first type of information that meets the first threshold.

9. A computer-implemented method of obtaining information for data store information deficits, the method comprising:
   accessing by a computing system a data store storing:
      a first type of information submitted by users related to catalog items in an interactive catalog of items being offered to users for purchase, and
      an identification as to which user submitted a given information of the first type;
   identifying, by the computing system, catalog items that do not have an amount of the first type of information that meets a first threshold;
   determining, by the computing system, user item affinity with respect to a user based at least in part on a similarity of at least one item, for which the user previously provided information of the first type, with at least one of the identified catalog items that do not have a sufficient amount of the first type of information that meets the first threshold;

recommending by the computing system to the user candidate items, identified as not having the amount of the first type of information that meets the first threshold, for the user to provide the first type of information for based at least in part on the determined user item affinity; and providing for display on a user system:
   a user interface that provides functionality for the user to select an item from the recommended candidate items that do not have a sufficient amount of the first type of information that meets the first threshold; and
   a user interface via which the user can provide the first type of information for an item selected by the user from the recommended candidate items that do not have a sufficient amount of the first type of information that meets the first threshold selected by the user.

10. The method as defined in claim 9, wherein the identification of catalog items that do not have a sufficient amount of the first type of information further comprises identifying catalog items that do not have an amount of information that meets the first threshold regarding at least one of: accessories for respective catalog items, substitute identification items for respective catalog items, manuals for respective catalog items, or item photographs for respective catalog items.

11. The method as defined in claim 9, wherein the identification of catalog items that do not have a sufficient amount of the first type of information further comprises identifying catalog items that do not have an amount of user provided descriptive tags that meets the first threshold.

12. The method as defined in claim 9, wherein the identification of catalog items that do not have a sufficient amount of the first type of information further comprises identifying catalog items that do not have an amount of indications of usefulness with respect to user submissions that meets the first threshold.

13. The method as defined in claim 9, wherein the identification of catalog items that do not have a sufficient amount of the first type of information further comprises identifying catalog items that do not have an amount of indications of accuracy with respect to user submissions that meets the first threshold.

14. The method as defined in claim 9, wherein the identification of catalog items that do not have a sufficient amount of the first type of information further comprises identifying catalog items that do not have an amount of online discussion content that meets the first threshold.

15. The method as defined in claim 9, wherein the identification of catalog items that do not have a sufficient amount of the first type of information further comprises identifying catalog items that do not have an amount of lists of related items that meets the first threshold.

16. The method as defined in claim 9, further comprising a search engine system configured to provide functionality for users to conduct searches to locate items in the interactive catalog that do not have the amount of the first type of information that meets the first threshold.

17. Non-transitory computer readable memory storing instructions that when executed by a computer system are configured to cause the computer system to perform operations comprising:
   accessing a data store storing:
      a first type of information submitted by users related to catalog items in an interactive catalog of items being offered to users for purchase, and
      an identification as to which user submitted a given information of the first type;
   identifying catalog items that do not have an amount of the first type of information that meets a first threshold;
   determining user item affinity with respect to a user based at least in part on a similarity of at least one item, for which the user previously provided information of the first type, with at least one of the identified catalog items that do not have a sufficient amount of the first type of information that meets the first threshold;
   recommending to the user candidate items, identified as not having the amount of the first type of information that meets the first threshold, for the user to provide the first type of information for based at least in part on the determined user item affinity; and
   providing for display on a user system:
      a user interface that provides functionality for the user to select an item from the recommended candidate items that do not have a sufficient amount of the first type of information that meets the first threshold; and
      a user interface via which the user can provide the first type of information for an item selected by the user from the recommended candidate items that do not have a sufficient amount of the first type of information that meets the first threshold.

18. The non-transitory computer readable memory as defined in claim 17, wherein the identification of catalog items that do not have a sufficient amount of the first type of information further comprises identifying catalog items that do not have an amount of information that meets the first threshold regarding at least one of: accessories for respective catalog items, substitute identification items for respective catalog items, manuals for respective catalog items, user submitted tags describing respective catalog items, or item photographs for respective catalog items.

19. The non-transitory computer readable memory as defined in claim 17, wherein the identification of catalog items that do not have a sufficient amount of the first type of information further comprises identifying catalog items that do not have an amount of indications of usefulness with respect to user submissions that meets the first threshold.

20. The non-transitory computer readable memory as defined in claim 17, wherein the identification of catalog items that do not have a sufficient amount of the first type of information further comprises identifying catalog items that do not have an amount of lists of related items that meets the first threshold.

* * * * *